United States Patent
Iwane

(10) Patent No.: US 7,705,907 B2
(45) Date of Patent: Apr. 27, 2010

(54) IMAGE DISPLAY APPARATUS AND CAMERA CAPABLE OF HAVING AN ELECTRONIC IMAGE SUPERIMPOSED ON AN OPTICAL IMAGE

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 652 days.

(21) Appl. No.: 11/362,898

(22) Filed: Feb. 28, 2006

(65) Prior Publication Data

US 2006/0250697 A1 Nov. 9, 2006

Related U.S. Application Data

(63) Continuation of application No. PCT/JP2004/012796, filed on Aug. 27, 2004.

(30) Foreign Application Priority Data

| Sep. 1, 2003 | (JP) | ............................ 2003-309077 |
| Oct. 14, 2003 | (JP) | ............................ 2003-354031 |
| Oct. 14, 2003 | (JP) | ............................ 2003-354034 |

(51) Int. Cl.
*H04N 5/225* (2006.01)
*H04N 5/222* (2006.01)
(52) U.S. Cl. .................... 348/341; 348/333.09
(58) Field of Classification Search ............... 348/337, 348/341–344, 333.01, 333.02, 333.09; 359/1, 359/636
See application file for complete search history.

(56) References Cited

U.S. PATENT DOCUMENTS

| 5,412,487 A | 5/1995 | Nishimura et al. |
| 5,448,401 A | 9/1995 | Takuma et al. |
| 5,615,045 A | 3/1997 | Takuma et al. |
| 5,734,428 A * | 3/1998 | Suda et al. .................. 348/341 |
| 6,094,241 A | 7/2000 | Yamazaki |
| 6,124,977 A | 9/2000 | Takahashi |

(Continued)

FOREIGN PATENT DOCUMENTS

JP 62-202681 A 9/1987

(Continued)

OTHER PUBLICATIONS

Japanese Office Action, mailed Oct. 20, 2009, with English Translation.

(Continued)

*Primary Examiner*—Kelly L Jerabek
(74) *Attorney, Agent, or Firm*—Oliff & Berridge, PLC

(57) ABSTRACT

What is disclosed is a display apparatus that introduce an electronic image that is generated electronically into a viewing optical system through which an object is viewed to make the electronic image viewable in such a way as to be superimposed on an image of the object. The electric image forming apparatus has a light source, a micro lens array and scanning means for scanning light from the light source to form an image on the micro lens array. There is disclosed a scanning display apparatus that introduces an image formed on the micro lens and superimpose it on an image of an object and a camera in which an object image formed optically and an electronic image are made viewable in a superimposed manner using the scanning display apparatus.

21 Claims, 14 Drawing Sheets

U.S. PATENT DOCUMENTS

| | | |
|---|---|---|
| 6,975,361 B2 | 12/2005 | Kamon et al. |
| 2001/0034077 A1 | 10/2001 | Wine et al. |
| 2002/0126396 A1* | 9/2002 | Dolgoff ...................... 359/743 |
| 2002/0131022 A1* | 9/2002 | Shibatani et al. .............. 353/31 |
| 2002/0167603 A1* | 11/2002 | Kato et al. .................. 348/341 |
| 2003/0218718 A1 | 11/2003 | Moliton et al. |

FOREIGN PATENT DOCUMENTS

| | | |
|---|---|---|
| JP | 02-285780 A | 11/1990 |
| JP | A 06-059217 | 3/1994 |
| JP | 06-169425 A | 6/1994 |
| JP | 06-202233 A | 7/1994 |
| JP | A-6-245114 | 9/1994 |
| JP | A 08-320451 | 12/1996 |
| JP | A 10-301055 | 11/1998 |
| JP | A 11-142783 | 5/1999 |
| JP | 2000-165718 A | 6/2000 |
| JP | A 2001-083455 | 3/2001 |
| JP | 001-235314 A | 8/2001 |
| JP | 2001-235314 A | 8/2001 |
| JP | 2002-094854 A | 3/2002 |
| JP | A 2003-029197 | 1/2003 |
| JP | A 2003-502714 | 1/2003 |
| JP | 2003-057732 A | 2/2003 |
| JP | A-2004-264520 | 9/2004 |
| WO | WO 00/79330 A1 | 12/2000 |
| WO | WO 03/058320 A1 | 7/2003 |

OTHER PUBLICATIONS

Japanese Office Action, mailed Oct. 6, 2009, with English Translation.

English-language translation of Japanese Office Action mailed Feb. 9, 2010.

* cited by examiner

IMAGE DISPLAY APPARATUS AND CAMERA CAPABLE OF HAVING AN ELECTRONIC IMAGE SUPERIMPOSED ON AN OPTICAL IMAGE

This is a Continuation of PCT/JP2004/012796 filed Aug. 27, 2004, the disclosure of which is incorporated herein by reference in its entirety.

TECHNICAL FIELD

The present invention relates to an image display apparatus that makes it possible to view an electronic image superimposed on an optical image formed by a viewing optical system and a camera equipped with such an image display apparatus.

BACKGROUND ART

There are known conventional information display apparatuses that display in an optical path of a viewing optical system information on the viewing optical system etc. so that the information can be observed together with an optical image formed by the viewing optical system. In particular, a scanning display apparatus that forms an electronic image on the retina of a viewer's eye using a scanning optical system to make it possible to view an electronic image together with an optical image has been proposed. (See for example, United States Patent Application No. 20010034077.)

However, the above-mentioned example of the scanning display apparatus suffers from a first problem that it is so large in size that it is difficult to build it in an small-size viewing optical system (such as a viewfinder) of a camera or a telescope or the like, since the scanning display apparatus is composed of optical components including a plurality of reflecting mirrors.

Furthermore, in conventional digital single lens reflex cameras, users take a photograph while viewing an image of the subject through a viewfinder, and have an image picked up by an image pickup element displayed in the viewfinder by means of a display device such as a liquid crystal display to check it (see for example, Japanese Patent Application Laid-open No. 6-245114). In this display method, since what is used for displaying photographed images is a liquid crystal display device, there is a second problem that resolution and saturation reproducibility are not good, and it is difficult for the user to examine whether or not a picked up image has desired image quality.

Still further, a conventional apparatus that displays an electronic image in an optical path of a viewing optical system to make it possible to view the electronic image together with an optical image formed by the viewing optical system is known from Japanese Patent Application Laid-Open No. 11-174367. However, since the display apparatus disclosed in Japanese Patent Application Laid-Open No. 11-174367 utilizes internal reflection of a prism member, it suffers from a third problem that light such as undesired reflected light from a reflection surface of the prism member that is not intended is incident on a view's eye and seen as a ghost.

In view of the above-mentioned first problem, a first object of the present invention is to provide a compact scanning display apparatus that can be built in an optical path of a viewing optical system and a camera equipped with such a scanning display apparatus.

In view of the above-mentioned second problem, a second object of the present invention is to provide a camera equipped with a display apparatus having high image quality.

In view of the above-described third problem, a third object of the present invention is to provide a compact display apparatus in which ghost is not formed.

To achieve the first object, according to the first aspect of the present invention there is provided a scanning display apparatus comprising superimposition means disposed in an optical path of a viewing optical system through which an image of an object is viewed, the superimposition means making an electronic image viewable in such a way as to be superimposed on said image of the object, a micro lens array disposed on an incidence end surface of said superimposition means on which said electronic image is incident, a light source for said electronic image, light condensing means for condensing light from said light source onto said micro lens array, and scanning means for scanning said micro lens array with said light, wherein an image formed on said micro lens array is made viewable.

To achieve the above-mentioned first object, according to a second aspect of the present invention, there is provided a scanning display apparatus comprising, superimposition means disposed in an optical path of a viewing optical system through which an image of an object is viewed, the superimposition means making an electronic image viewable in such a way as to be superimposed on said image of the subject, a light source for said electronic image, light condensing means for condensing light from said light source onto an incidence end surface of said superimposition means, and scanning means for scanning said incidence end surface with said light, wherein said superimposition means includes a polarizing beam splitter disposed in the optical path of said viewing optical system that reflects light from said incidence end surface, a reflecting condenser member disposed in the optical path of said viewing optical system that transmits light of said viewing optical system and reflects light from said polarizing beam splitter., and a quarter-wave plate disposed between said polarizing beam splitter and said reflecting condenser member.

According to a third aspect of the present invention, in the scanning display apparatus according to the first aspect, it is preferred that said superimposition means includes a polarizing beam splitter disposed in the optical path of said viewing optical system that reflects light from said incidence end surface, a reflecting condenser member disposed in the optical path of said viewing optical system that transmits light of said viewing optical system and reflects light from said polarizing beam splitter, and a quarter-wave plate disposed between said polarizing beam splitter and said reflecting condenser member.

According to a fourth aspect of the present invention, in the scanning display apparatus according to the first or third aspect, it is preferred that said superimposition means includes a reflection type hologram disposed in the optical path of said viewing optical system, said reflection type hologram reflecting light from said micro lens array.

In the scanning display apparatus according to the first, third or fourth aspect of the present invention, it is preferred that said micro lens array be carved on said incidence end surface of a plane parallel optical member, or said micro lens array be molded and attached on said incidence end surface.

In the scanning display apparatus according to the first, third or fourth aspect of the present invention, it is preferred that said micro lens array be composed of a hologram device.

In the scanning display apparatus according to the second or third aspect of the present invention, it is preferred that said reflecting condenser member be composed of a hologram device.

In the scanning display apparatus according to the first or second aspect of the present invention, it is preferred that said scanning means be composed of a movable mirror or an acoustooptic device.

In the scanning display apparatus according to the first or second aspect of the present invention, it is preferred that the axis of incidence of light from said light source to said scanning means and the optical axis of said viewing optical system be oriented in substantially the same direction.

In the scanning display apparatus according to the first or second aspect of present invention, it is preferred that the axis of incidence of light from said light source to said scanning means and the optical axis of said viewing optical system be substantially perpendicular, and a half-wave plate be provided between said scanning means and said polarizing beam splitter.

According to a fifth aspect of the present invention, there is provided a camera equipped with said scanning display apparatus.

To achieve the above-mentioned second object, according to a sixth aspect of the present invention, there is provided a camera comprising a viewing optical system that makes an image of a subject formed through a taking optical system viewable, an image pickup means for picking up said image of the subject, reproduction means for reproducing an image of the subject picked up by said image pickup means, introduction means disposed on the optical axis of said viewing optical system for introducing an image reproduced by said reproduction means onto the optical axis of said viewing optical system to make it viewable, and limiting means for limiting a light flux entering said viewing optical system from said taking optical system.

In the camera according to the sixth aspect of the present invention, it is preferred that said image of the subject and said reproduced image be viewable in a superimposed manner.

In the camera according to the sixth aspect of the present invention, it is preferred that said limiting means be composed of a quick return mirror that selectively guides a light flux from said taking optical system to said viewing optical system, and that when an image is introduced into said viewing optical system by said introduction means, said limiting means blocks a light flux traveling from said taking optical system to said viewing optical system.

In the camera according to the sixth aspect of the present invention, it is preferred that said limiting means be light quantity limiting means for limiting the quantity of a light flux that forms said image of the subject, and that when an image is projected in said viewing optical system by said introduction means, said limiting means limits a light flux traveling from said taking optical system to said viewing optical system.

In the camera according to the sixth aspect of the present invention, it is preferred that the camera further comprise image processing means for applying characterization on at least a part of said reproduced image.

In the camera according to the sixth aspect of the present invention, it is preferred that said display member can display an image representing control information of said camera.

To achieve the above-mentioned third object, according to a seventh aspect of the present invention, there is provided a display apparatus comprising, an optical member having a flat-plate shape disposed in an optical path of a viewing optical system in such a way that its flat surface is substantially perpendicular to the optical axis of said optical path, said flat surface constituting an optical waveguide, image forming means disposed in the vicinity of an end surface of said optical member, a polarizing plate disposed between said image forming means and the end surface of said optical member, a polarizing beam splitter for separating, among image light fluxes entering into said optical member from said image forming means, a light flux that is polarized in a predetermined direction by said polarizing plate, and a quarter-wave plate disposed on said flat surface, wherein among light fluxes propagating in said optical member, a reflected light flux that has passed through said quarter-wave plate is separated by said polarizing beam splitter toward a direction that is different from the direction of said separation.

To achieve the above-mentioned third object, according to an eighth aspect of the present invention, there is provided a display apparatus comprising an optical member having a flat-plate shape disposed in an optical path of a viewing optical system in such a way that its flat surface is substantially perpendicular to the optical axis of said optical path, said flat surface constituting an optical waveguide, image forming means disposed in the vicinity of an end surface of said optical member, a reflection member that reflects an image light flux entering into said optical member from said image forming means toward said viewing optical system, and a light regulating member disposed on said flat surface that transmits a light flux incident on said flat surface substantially perpendicularly and reflects a light flux incident on said flat surface at a predetermined angle to a direction different from the direction of incidence, wherein among light fluxes propagating in said optical member, a light flux traveling toward said flat surface is separated by said light regulating member toward a direction different from said reflection member.

To achieve the above-mentioned third object, according to a ninth aspect of the present invention, there is provided a display apparatus comprising an optical member having a flat-plate shape that constitutes an optical waveguide, a polarizing beam splitter formed inside said optical member that reflects, among light fluxes propagating in said optical member, a light flux that is polarized in a specific direction, and a quarter-wave plate disposed on a surface of said optical member, wherein among light fluxes propagating in said optical member, a reflected light flux that has passed through said quarter-wave plate is transmitted through the polarizing beam splitter.

To achieve the above-mentioned third object, according to a tenth aspect of the present invention, there is provided a display apparatus comprising an optical member having a flat-plate shape that constitutes an optical waveguide, a polarizing beam splitter formed inside said optical member that transmits, among light fluxes propagating in said optical member, a light flux that is polarized in a specific direction, and a quarter-wave plate disposed on a surface of said optical member, wherein among light fluxes propagating in said optical member, a reflected light flux that has passed through said quarter-wave plate is reflected by the polarizing beam splitter.

To achieve the above-mentioned third object, according to a eleventh aspect of the present invention, there is provided a display apparatus comprising an optical member having a flat-plate shape that constitutes an optical waveguide, a polarizing beam splitter formed inside said optical member that separates, among light fluxes propagating in said optical member, a light flux that is polarized in a specific direction, and a quarter-wave plate disposed on a surface of said optical member, wherein among light fluxes propagating in said optical member, a reflected light flux that has passed through said quarter-wave plate is separated by said polarizing beam splitter toward a direction that is different from the direction of said separation.

THE BEST MODE FOR CARRYING OUT THE INVENTION

In the following, embodiments of the present invention will be described with reference to the drawings.

Figure 1:
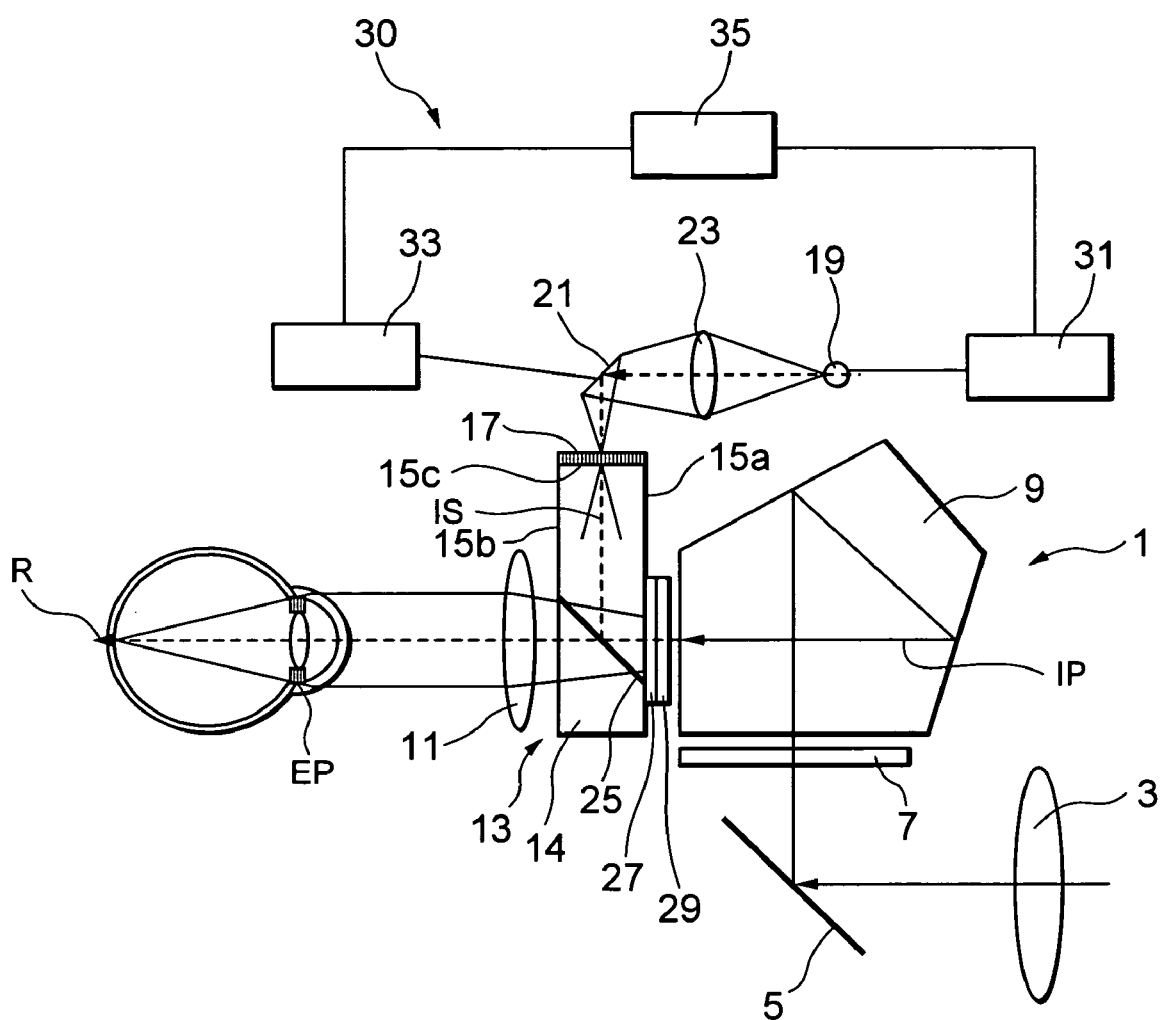
FIG. 1 is schematically shows the configuration of a camera equipped with a scanning display apparatus according to a first embodiment of the present invention.
Figure 2:
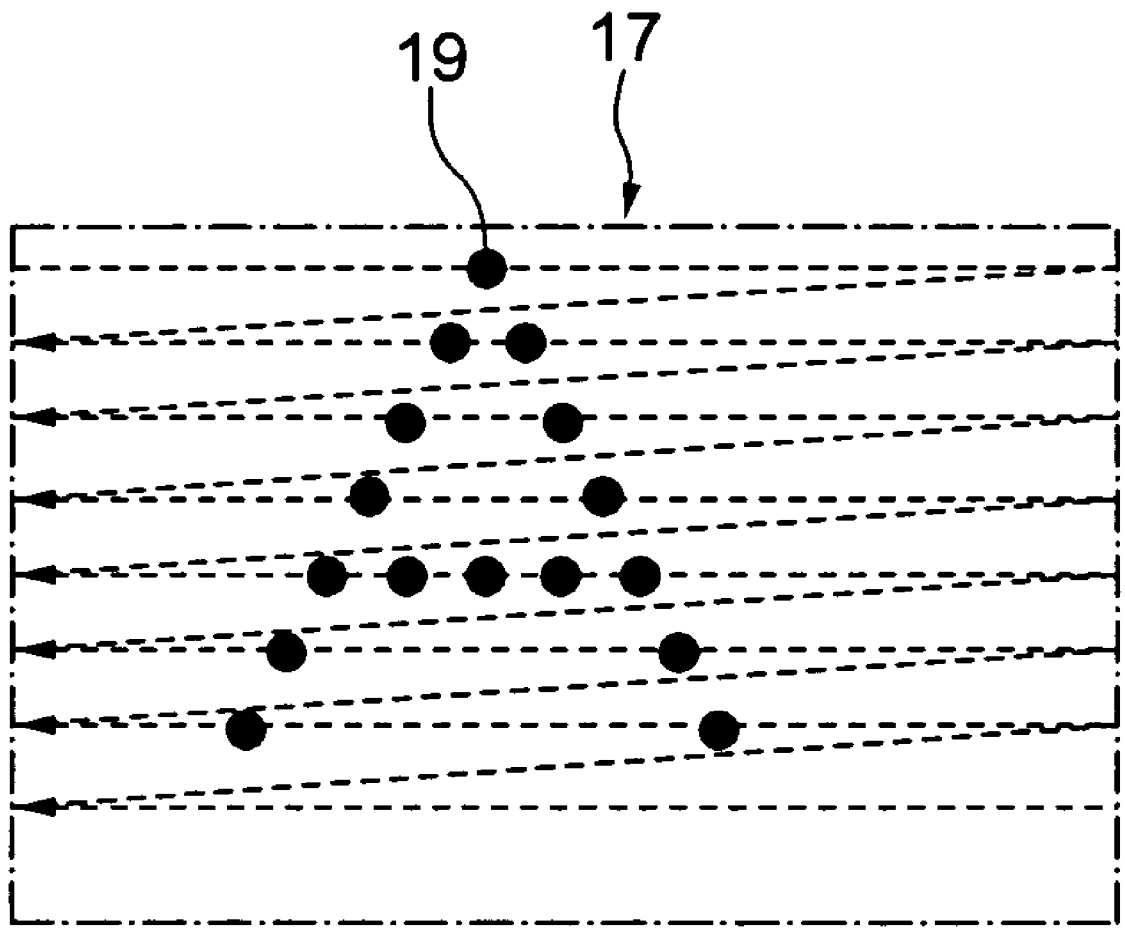
FIG. 2 shows an example of the way of scanning in the scanning display apparatus according to the first embodiment.
Figure 3:
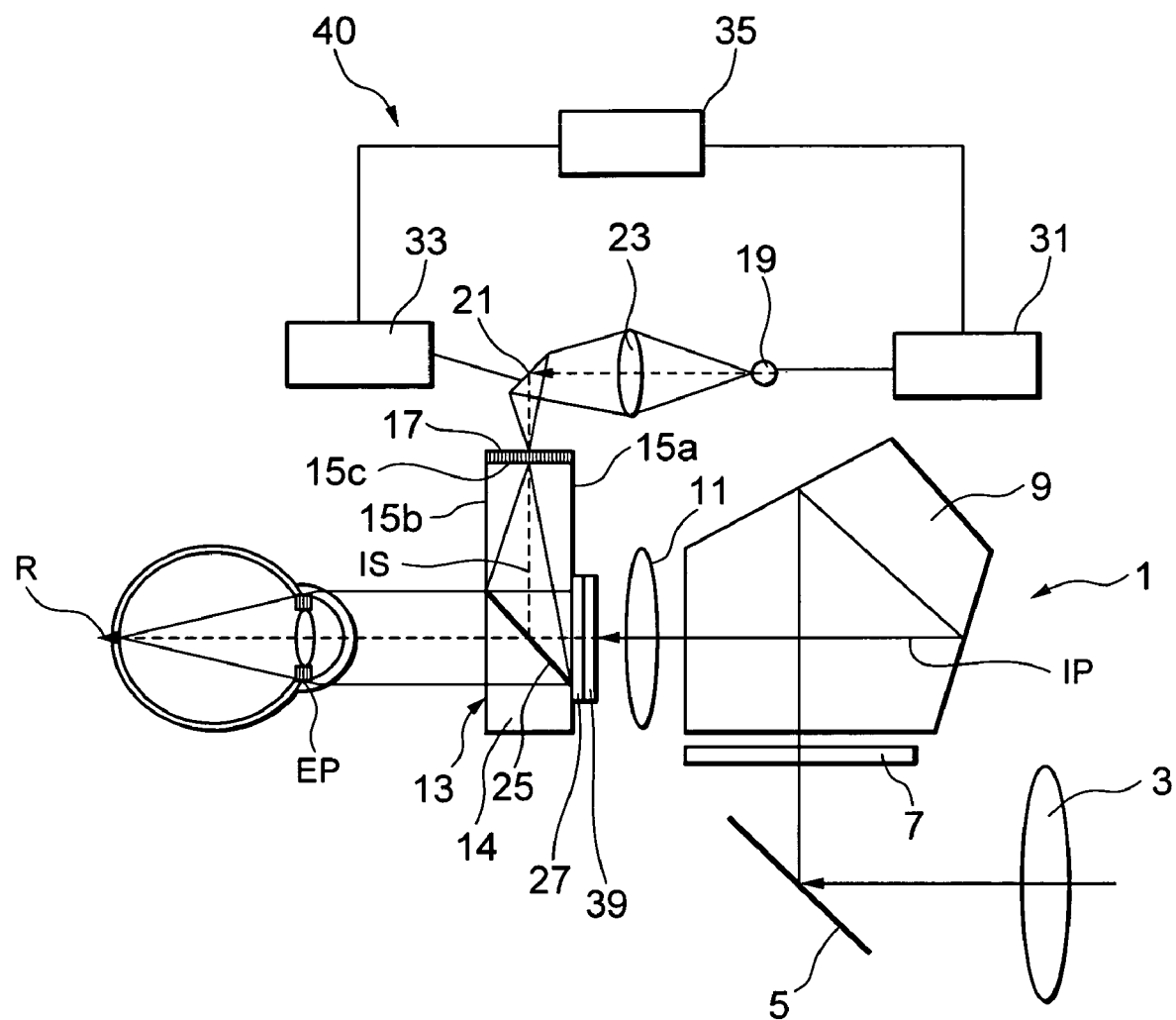
FIG. 3 schematically shows the configuration of a camera equipped with a scanning display apparatus according to a second embodiment of the present invention.
Figure 4:
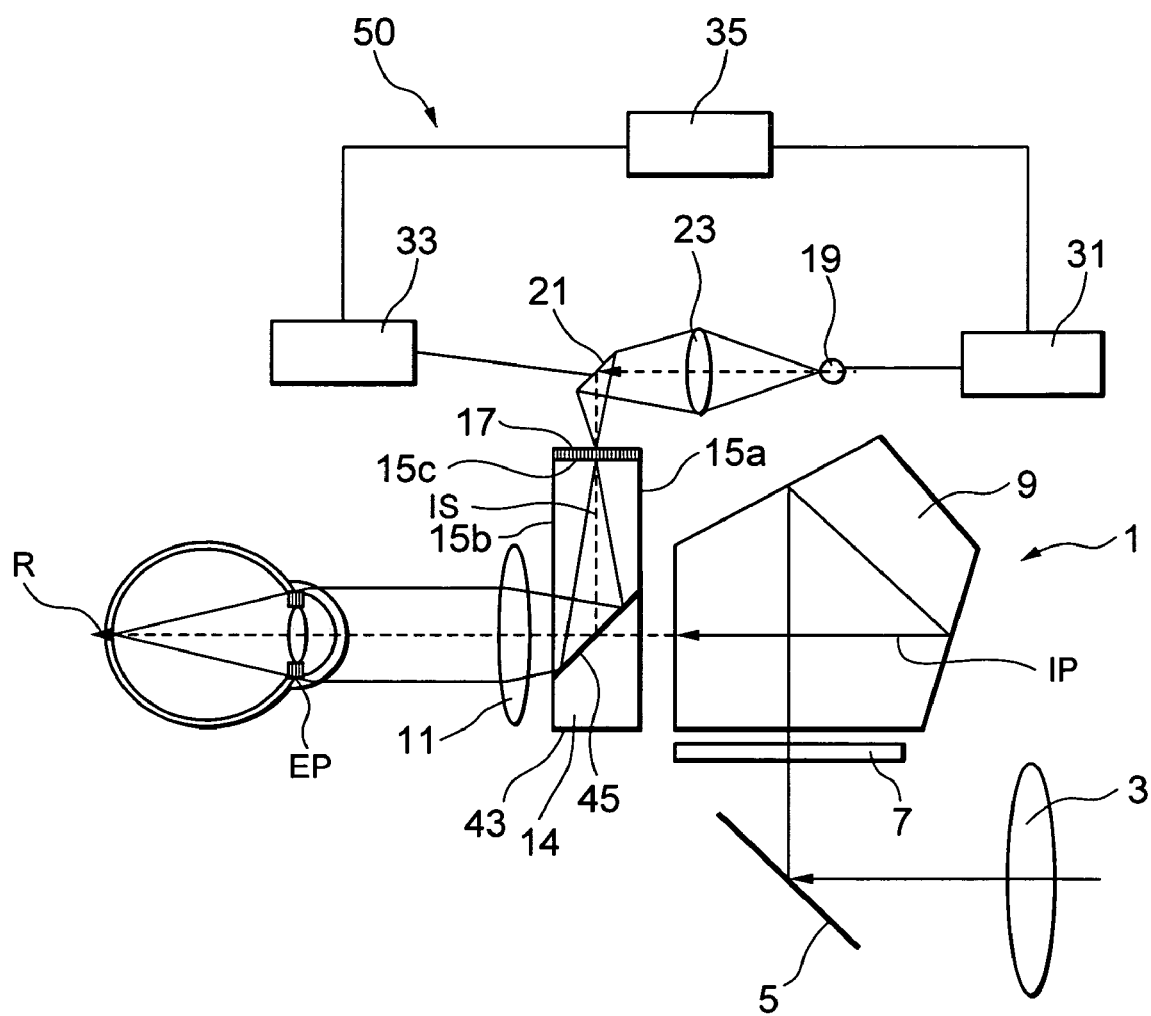
FIG. 4 schematically shows the configuration of a camera equipped with a scanning display apparatus according to a third embodiment.

FIG. 1 is schematically shows the configuration of a camera equipped with a scanning display apparatus according to a first embodiment of the present invention. FIG. 2 shows an example of the way of scanning in the scanning display apparatus according to the first embodiment. FIG. 3 schematically shows the configuration of a camera equipped with a scanning display apparatus according to a second embodiment of the present invention. FIG. 4 schematically shows the configuration of a camera equipped with a scanning display apparatus according to a third embodiment.

First Embodiment

In FIG. 1, light from a subject (not shown) is guided to a mirror 5 such as a semi-transparent mirror or a quick return mirror through a taking lens 3, reflected by the mirror 5 and focused on a focusing screen 7. The image of the subject formed on the focusing screen 7 is incident on an eyepiece lens 11 through a pentaprism 9, and a photographer's eye located at the eye point EP sees it. The viewing 5 optical system 1 is configured in this way.

In the optical path of the viewing optical system 1 between the pentaprism 9 and the eyepiece lens 11, there is provided superimposition means 13 for displaying an electronic image containing photographing information etc. superimposed on an image of the subject. The superimposition means 13 includes a plane parallel optical member 14 having a pair of flat surfaces 15a and 15b that are substantially perpendicular to the optical axis IP of the viewing optical system 1 and a flat surface 15c that is substantially perpendicular to the flat surfaces 15a and 15b. An array of two-dimensionally arranged micro lenses 17 is disposed on the flat surface 15c on which the electronic image is made incident. In the vicinity of the micro lens array 17, there is provided scanning means 21 for bending light from a light source 19 at an angle of approximately 90 degrees and two-dimensionally scanning the micro lens array 17 with the light. Light from the light source 19 is condensed onto the micro lens array 17 by a collimator lens system 23. The light source 19 is equipped with light source modulation means 31 for controlling the brightness and ON/OFF of the light source. The scanning means 21 is equipped with scanning control means 33 for controlling the incident light for two-dimensional scanning and synchronization control means 35 for effecting a control to cause the light source modulation means 31 and the scanning control means 33 to operate in synchronization with each other.

The superimposition means 13 is provided with a polarizing beam splitter (which will be abbreviated as PBS hereinafter) 25 that is inclined to form an angle of approximately 45 degrees with the optical axis IP of the viewing optical system 1 and the optical axis IS of the display optical system respectively. The polarizing beam splitter 25 reflects light from the electronic image (which will also be referred to as displayed image) imaged on the micro lens array 17 toward the pentaprism 9. The reflected light is incident on and transmitted through a quarter-wave plate 27 disposed in the optical path of the viewing optical system 1 on the flat surface 15a facing the pentaprism 9, thereafter incident on a reflecting condenser member 29 and reflected back toward the PBS 25. The quarter-wave plate 27 and the reflecting condenser member 29 are made of materials that are substantially transparent to the light traveling in the optical path of the viewing optical system 1, and therefore the image of the subject is hardly deteriorated. The light reflected by the reflecting condenser member 29 and returned back to the PBS 25 is transmitted through the PBS 25, as will be described later, and seen through the eyepiece lens 11. The scanning display apparatus 30 that makes it possible to view the displayed image from the micro lens array 17 superimposed on the image of the subject from the viewing optical system 1 is constructed in this way.

In the following, the scanning display apparatus 30 will be described in detail.

Light from the light source 19 is bent by the scanning means 21 at a substantially right angle and scanned over a predetermined angle range. The scanning light enters the micro lens array 17 arranged two-dimensionally on the incidence end surface 15c of the plane parallel optical member 14 of the superimposition means 13 to form a displayed image.

FIG. 2 illustrates a way of scanning of light on the micro lens array 17. If it is assumed for example that in FIG. 1, the scanning means 21 can scan the light from the light source 19 over an angle range of approximately 4 degrees in the horizontal direction and an angle range of approximately 3 degrees in the direction perpendicular to the plane of the drawing sheet and scanning is effected at 28.8 kHz in the horizontal direction and 60 Hz in the vertical direction, the micro lens array 17 will be scanned with 480 scanning lines, and scanning will be effected repeatedly 60 times per one second. In this process, if the light source 19 is always on, the micro lens array 17 will be viewed in a bright state uniformly illuminated by light. By turning on the light source 19 while synchronizing the scanning control means 33 and the light source modulation means 31 that control the radiation intensity of the light source 19 by the synchronization control means 35, it is possible to display, for example, letter "A" as a dot image on the micro lens array 17.

Since the resolution of the entire image is determined by the size of the dot image formed by scanning, it is necessary that the light from the light source 19 be condensed on the micro lens array 17. In view of this, the light from the light source 19 is condensed onto the micro lens array 17 by the collimator lens system 23.

The light emergent from the micro lens array 17 is reflected by the PBS 25 having wavelength-selectivity and travels toward the pentaprism 9. Then, the light is transmitted through the quarter-wave plate 27 provided on the flat surface 15*a* of the plane parallel optical member 14 and reflected by the reflecting condenser member 29 on which a hologram or wavelength selection film is attached (which will be representatively referred to as hologram hereinafter) so as to be returned to the PBS 25. Since the direction of polarization of the returned light has been changed as will be described later, it is transmitted through the PBS 25 and emitted from the flat surface 15*b* of the superimposition means 13, so that it can be observed.

The scanning means 21 (for example, a two-dimensionally movable mirror or an acoustooptic device) is made conjugate with the eye point EP (at which the pupil of a viewer's eye is positioned) by the refractive power of the micro lens array 17, the hologram 29 and the eyepiece lens 11. Consequently, it may be considered that the retina R is scanned by the scanning means 21 with the light from the light source 19 with the pupil being the pivot of scanning.

The apparatus is configured in such a way that the refractive power of the hologram 29 and the eyepiece lens 11 makes the micro lens array 17 substantially conjugate with the retina R of the viewer's eye located at the eye point EP for viewing. Thus, a dot image on the micro lens array 17 is projected onto the retina R of the viewer's eye as it is, and when the dot image is moved in a scanning manner by the scanning means 21, it is recognized by the viewer as a displayed image.

In the case where the light source 19 is a finite light source such as an LED, the micro lens array 17 should be placed at a position conjugate with the light source 19, and in the case where the light source 19 is a laser (e.g. a semiconductor laser), the micro lens array 17 should be placed at the position of the focal point of the collimator lens system 23. If a laser is used as the light source 19, it is necessary to adjust the polarization direction of the laser beam in such a way that it is reflected by the PBS 25, as will be described later. Color content can also be displayed by using multiple light sources of red, green and blue as the light source 19 for superimposition on the micro lens array 17.

The light condensed on the micro lens array 17 enters the superimposition means 13 and travels along the optical axis IS. Then, for example the P polarization component of the light is reflected by the PBS 25 provided in the superimposition means 13 and travels toward the quarter-wave plate 27 and the hologram 29. The light transmitted through the quarter-wave plate 27 provided on the flat surface 15*a* is converted into circularly-polarized light and reflected by the hologram 29. The light is transmitted through the quarter-wave plate 27 again and enters the PBS 25. Since this light has been changed into linearly-polarized light whose polarization direction has been rotated 90 degrees from the polarization direction of the light that enters the PBS 25 from the micro lens array 17, it is transmitted through the PBS 25 and exits from the flat surface 15*b* of the superimposition means 13. Thus, the viewer can observe the light.

In view of the polarization direction through reflection by the scanning means 21, it is preferred that the axis of the light from the light source 19 and the axis of the light emergent from the superimposition means 13 be oriented in the same direction. In the case where the light from the light source 19 is incident from the front side or the rear side of the plane of the drawing sheet of FIG. 1, the above-described condition of the polarization direction of the light incident on the PBS 25 can be realized by inserting a half wave plate between the micro lens array 17 and the scanning means 21. By imaging a displayed image on the micro lens array 17, the pupil diameter (angle of view) is effectively enlarged upon viewing the displayed image, and therefore the displayed image can be imaged on the retina R of the viewer without fail even if the position of the viewer's eye is displace or inclined from the optical axis. Since the decrease in the quantity of light of the displayed image is essentially limited only to the decrease relating to polarization (i.e. approximately 50%), high brightness of the displayed image can be achieved.

Thus, it is possible to realize a scanning display apparatus 30 by which an image of the subject (not shown) transmitted through the taking lens 3 and the displayed image on the micro lens 17 are superimposed on the retina R for view, and to realize a camera equipped with such a scanning display apparatus.

The scanning display apparatus 30 according to this embodiment may be provided not only in a camera but also in other observation optical systems such as a telescope to make it possible to view an image of a subject and a displayed image in a superimposed manner.

In this first embodiment, the superimposition means 13 is disposed between the pentaprism 9 and the eyepiece lens 11. Therefore, it is possible to correct differences in diopters among viewers by the eyepiece lens 11, thereby improving viewing quality of the image of the subject and the displayed image. By determining the refractive power of the hologram 29 taking into account the refractive power of the eyepiece lens 11, it is possible to superimpose the image of the subject imaged on the focusing plate 7 and the displayed image imaged on the micro lens array 17 on the retina R of the viewer's eye.

Second Embodiment

Next, a scanning display apparatus and a camera according to the second embodiment of the present invention will be described. What is different in the second embodiment from the first embodiment is that superimposition means 13 is disposed between the eyepiece lens 11 and the eye point EP. Components similar to those in the first embodiment will be designated by the same reference signs, and descriptions thereof will be omitted.

In FIG. 3, superimposition means 13 for displaying an electronic image containing photographing information etc. superimposed on an image of a subject is provided in an optical path of the viewing optical system between the eyepiece lens 11 and the eye point EP. The other components and operations are the same as those in the first embodiment, and descriptions thereof will be omitted.

In the second embodiment, a scanning display apparatus 40 is provided in a conventional viewfinder optical system, thereby making an image of a subject (not shown) formed by the taking lens 11 and a displayed image formed on the micro lens array 17 viewable in a superimposed manner.

Since the refractive power (reflective power) of the reflecting condenser member 39 does not affect light of the viewing optical system, it is sufficient for the apparatus to be configured in such a way that the displayed image on the micro lens array 17 is imaged on the retina R of a viewer's eye positioned at the eye point EP.

Third Embodiment

Next, a scanning display apparatus and a camera according to a third embodiment of the present invention will be described. What is different in the third embodiment from the first embodiment is that the polarizing beam splitter has been replaced by a reflection type hologram. Components similar to those in the first embodiment will be designated by the same reference signs, and descriptions thereof will be omitted.

In FIG. 4, in superimposition means 43 is provided with a reflection type hologram 45 that is inclined to form an angle of approximately 45 degrees with the optical axis IP of the viewing optical system and the axis IS of the display light respectively. The reflection type hologram 45 reflects light from the displayed image imaged on the micro lens array 17 toward the eye point EP. The reflected light is viewed at the eye point position EP through the eyepiece lens 11. The reflection type hologram 45 is made of a material that is substantially transparent to light traveling in the optical path of the viewing optical system 1, and accordingly the image of the subject is hardly deteriorated. The scanning display apparatus 50 that makes it possible to view the displayed image from the micro lens array 17 superimposed on the image of the subject from the viewing optical system 1 is constructed in this way.

The superimposition means 43 may be disposed between the eyepiece lens 11 and the eye point EP, as is the case with the second embodiment.

As described above, according to this embodiment of the scanning display apparatus, it is possible to provide a compact scanning display apparatus that makes it possible to view an optical image and a highly-bright, high-resolution electronic image in a superimposed manner and hardly deteriorates the quality of the optical image, and it is also possible to provide a camera equipped with such a scanning display apparatus.

Next, a fourth and a fifth embodiments of the present invention will be described with reference to FIGS. 5 to 11.

Figure 5:
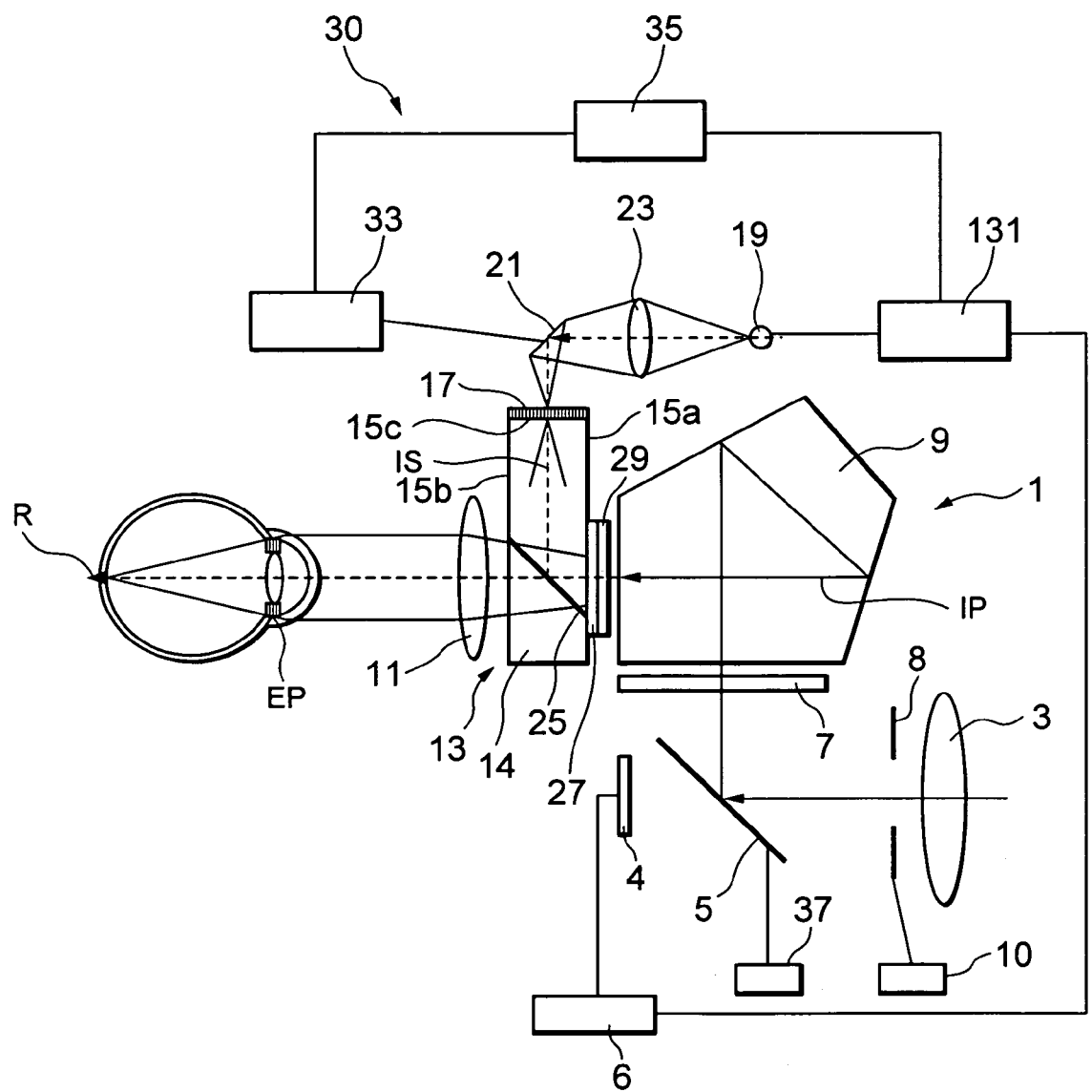
FIG. 5 schematically shows the configuration of a camera according to a fourth embodiment.
Figure 6:
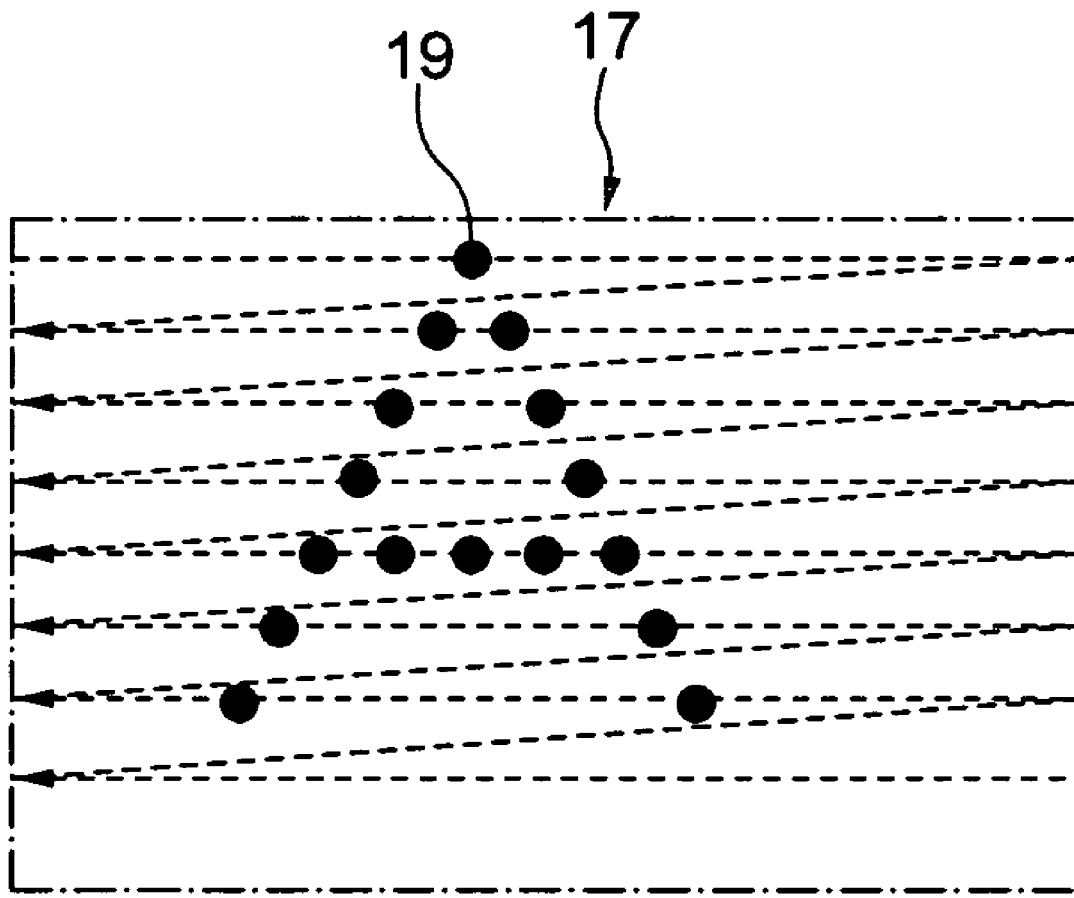
FIG. 6 shows an example of the way of scanning on a micro lens array in the fourth embodiment.
Figure 7:
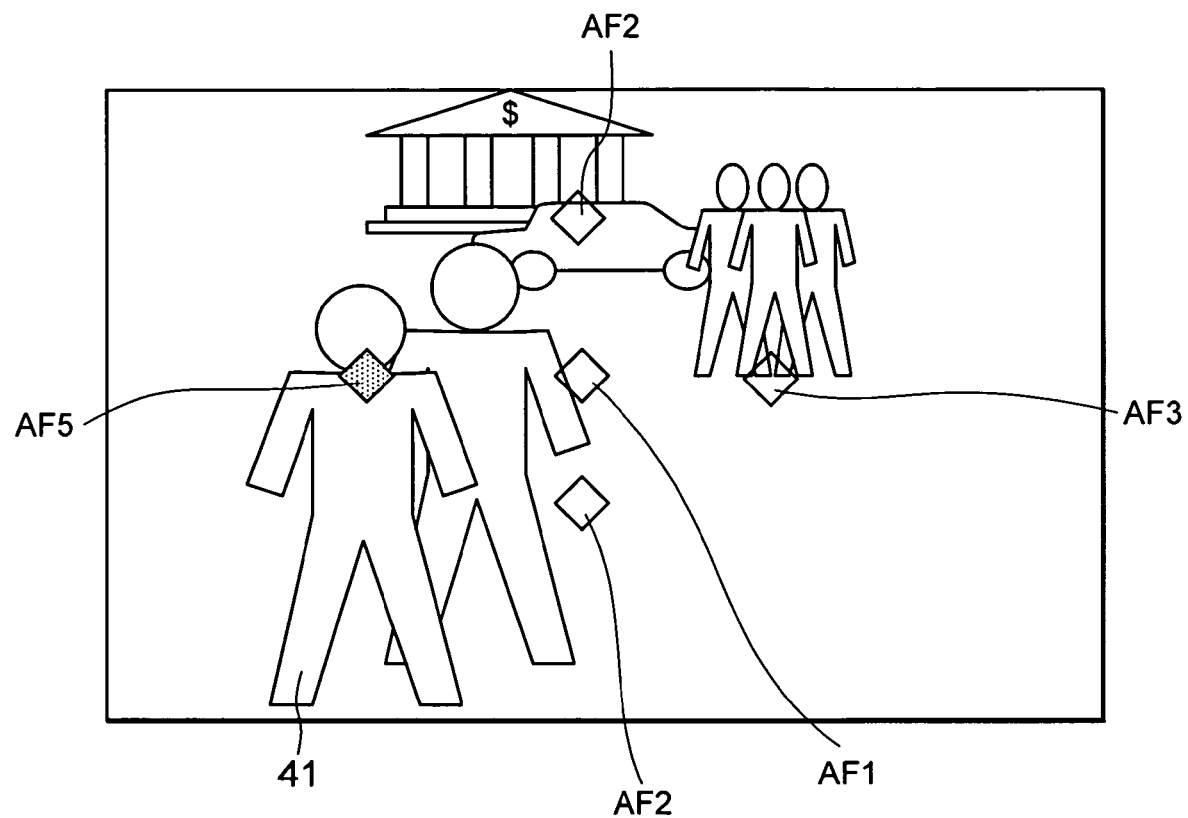
FIG. 7 shows how an image of the subject and control information of the camera are superimposed in the viewfinder of the camera according to the fourth embodiment.
Figure 8:
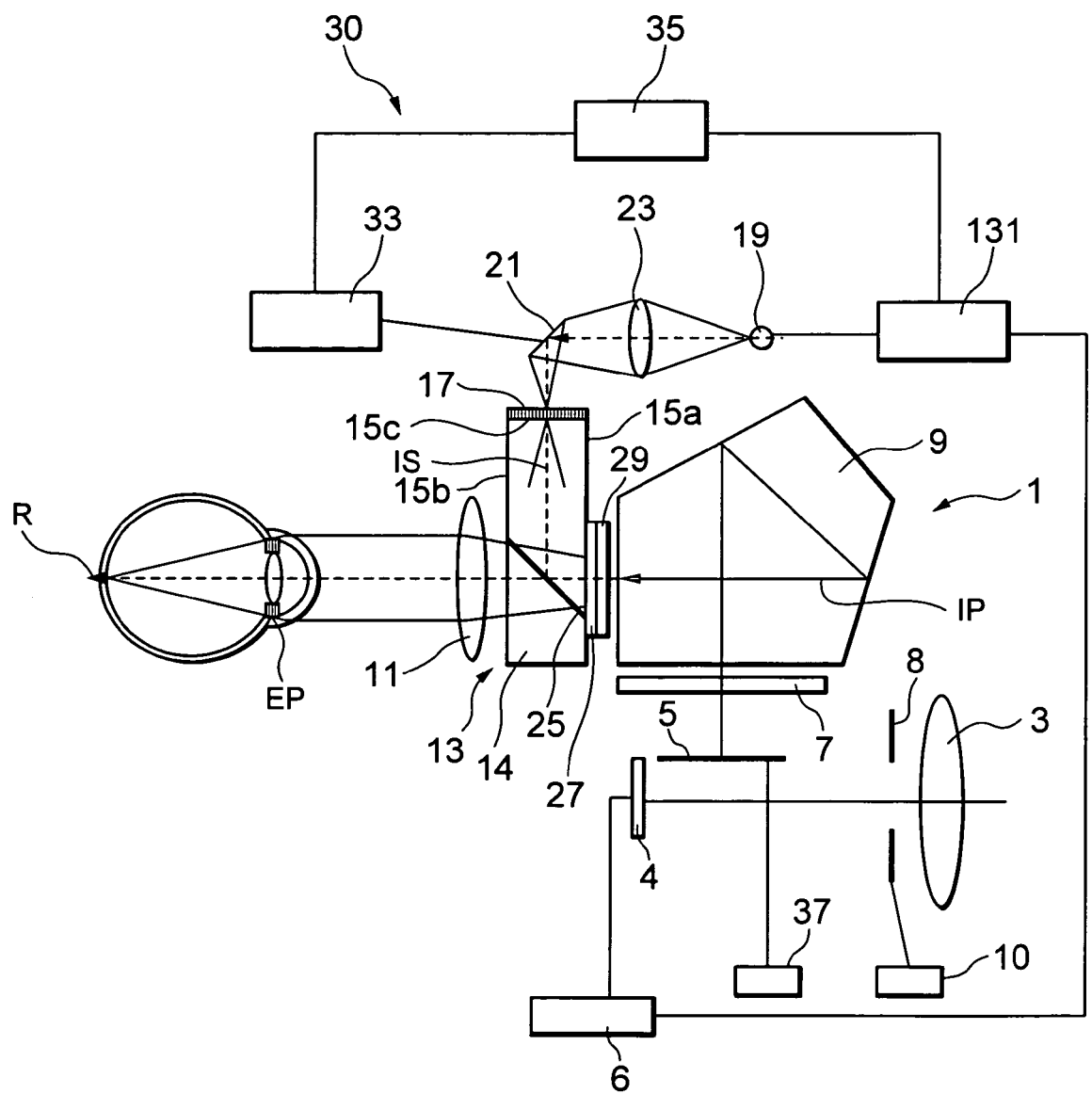
FIG. 8 shows how a reproduced image of a picked-up image is viewed in the camera according to the fourth embodiment.
Figure 9:
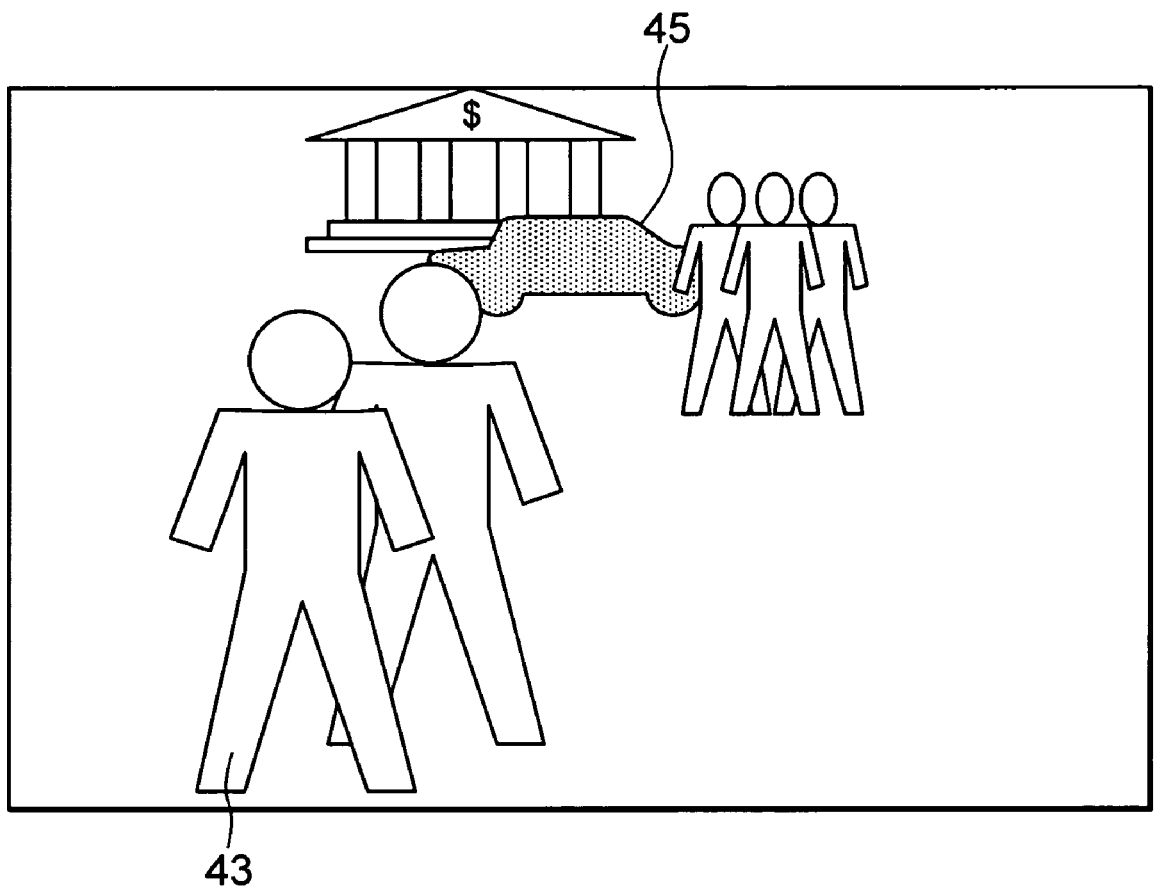
FIG. 9 shows how characterization is effected on a picked-up image reproduced on the viewfinder of the camera according to the fourth embodiment.
Figure 10:
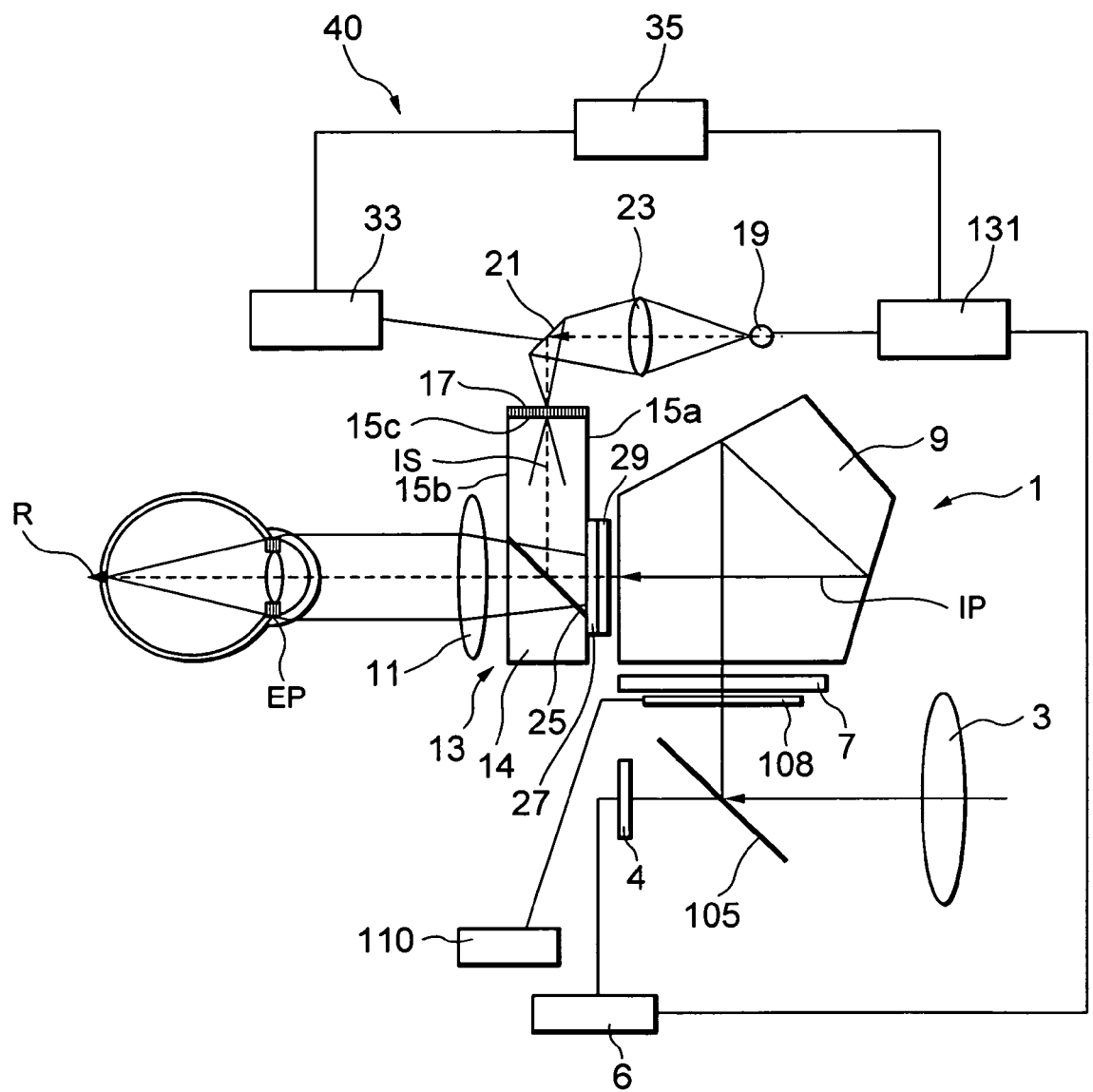
FIG. 10 schematically shows the configuration of a camera according to a fifth embodiment of the present invention.
Figure 11:
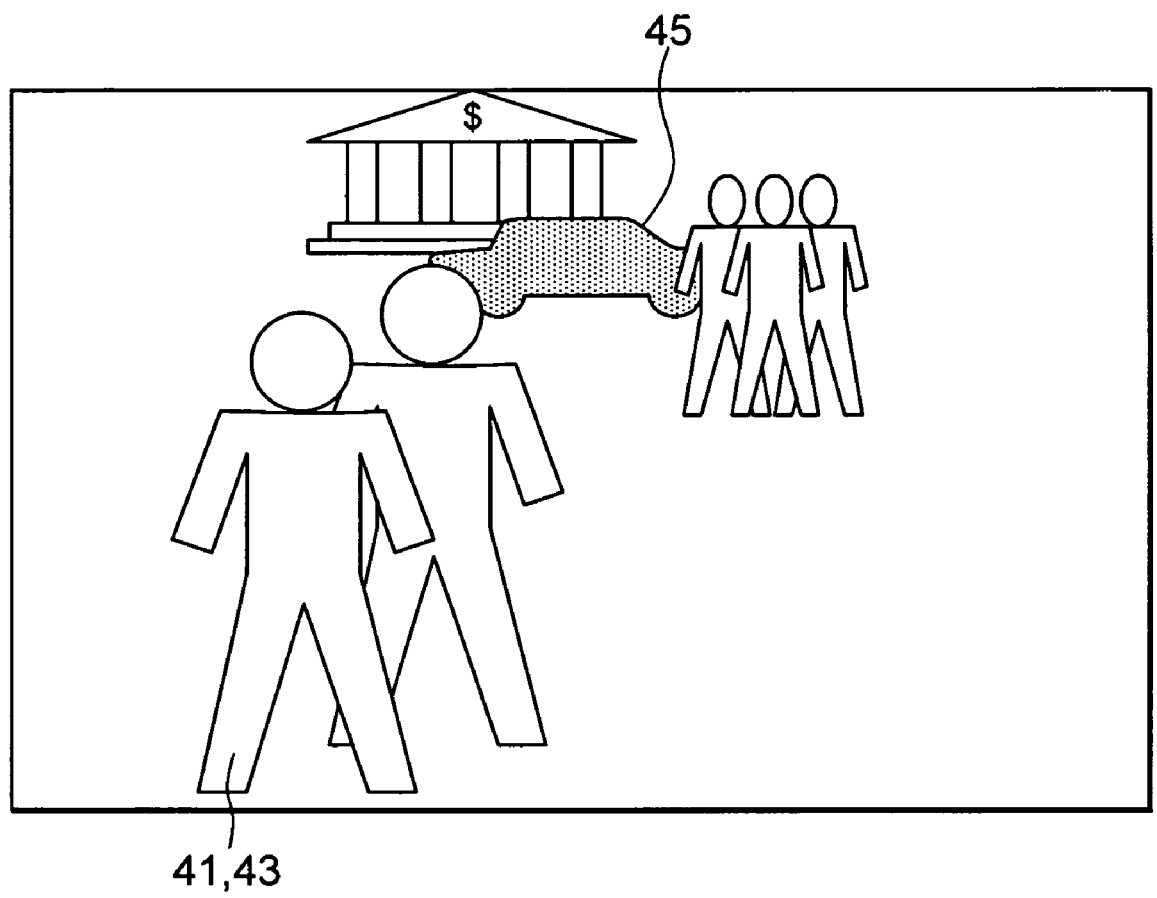
FIG. 11 shows how an image of a subject and a reproduced image of a picked-up image are superimposed in the viewfinder of the camera according to the fifth embodiment with characterization effected thereon.

FIG. 5 schematically shows the configuration of a camera according to the fourth embodiment. FIG. 6 shows an example of the way of scanning on a micro lens array in the fourth embodiment. FIG. 7 shows how an image of the subject and control information of the camera are superimposed in the viewfinder of the camera according to the fourth embodiment. FIG. 8 shows how a reproduced image of a picked-up image is viewed in the camera according to the fourth embodiment. FIG. 9 shows how characterization is effected on a picked-up image reproduced on the viewfinder of the camera according to the fourth embodiment. FIG. 10 schematically shows the configuration of a camera according to the fifth embodiment of the present invention. FIG. 11 shows how an image of a subject and a reproduced image of a picked-up image are superimposed in the viewfinder of the camera according to the fifth embodiment with characterization effected thereon.

Fourth Embodiment

In FIG. 5, light coming from a subject to be photographed (not shown) through a taking lens 3 is reflected by a quick return mirror 5 and focused on a focusing screen 7. The image of the subject formed on the focusing screen 7 is incident on an eyepiece lens 11 through a pentaprism 9, and seen by a photographer's eye located at the eye point EP. When the photographer depresses a shutter release button (not shown) after determining the composition, the quick return mirror 5 is moved away from the optical axis of the taking optical system by mirror control means 37, and light from the subject to be photographed is focused on an image pickup element 4. The picked-up image is stored in image processing means 6. Image information from the image processing means 6 is sent to display control means 131, and superimposed in the viewing optical system by superimposition means 13 that will be described later so as to be made viewable.

In the optical path of the viewing optical system 1 between the pentaprism 9 and the eyepiece lens 11, there is provided superimposition means 13 that can display an electronic image of camera control information and a reproduced image of an image picked up by the image pickup element 4 superimposed on the image of the subject.

The superimposition means 13 includes a plane parallel optical member 14 having a pair of flat surfaces 15a and 15b that are substantially perpendicular to the optical axis IP of the viewing optical system 1 and a flat surface 15c that is substantially perpendicular to the flat surfaces 15a and 15b. An array of two-dimensionally arranged micro lenses 17 is disposed on the flat surface 15c on which an electronic image is made incident. In the vicinity of the micro lens array 17, there is provided scanning means 21 for bending light from a light source 19 controlled by display control means 131 at an angle of approximately 90 degrees and two-dimensionally scanning the light on the micro lens array 17. Light from the light source 19 is condensed onto the micro lens array 17 by a collimator lens system 23.

Scanning control means 33 is provided for the scanning means 21, and synchronization control means 35 for controlling the display control means 131 and the scanning control means 33 to operate in synchronization with each other.

The superimposition means 13 is provided with a polarizing beam splitter (which will be abbreviated as PBS hereinafter) 25 that is inclined to form an angle of approximately 45 degrees with the optical axis IP of the viewing optical system 1 and the optical axis IS of the display optical system respectively. The polarizing beam splitter 25 reflects light from the electronic image (which will be sometimes referred to as displayed image) imaged on the micro lens array 17 toward the pentaprism 9. The reflected light is incident on and transmitted through a quarter-wave plate 27 disposed in the optical path of the viewing optical system 1 on the flat surface 15a facing the pentaprism 9, thereafter incident on a reflecting condenser member 29 and reflected back toward the PBS 25. The quarter-wave plate 27 and the reflecting condenser member 29 are made of materials that are substantially transparent to light traveling in the optical path of the viewing optical system 1, and therefore the image of the subject is hardly deteriorated. The light reflected by the reflecting condenser member 29 and returned back to the PBS 25 is transmitted through the PBS 25, as will be described later, and seen through the eyepiece lens 11. The scanning display apparatus 30 that makes it possible to view the displayed image from the micro lens array 17 superimposed on the image of the subject from the viewing optical system 1 is constructed in this way. The optical axis IP of the viewing optical system 1 and the axis IS of the display light are arranged to be substantially perpendicular to each other.

In the following, the scanning display apparatus 30 will be described in detail.

Light from the light source 19 is bent by the scanning means 21 at a substantially right angle and scanned over a predetermined angle range. The scanning light enters the micro lens array 17 arranged two-dimensionally on the incidence end surface 15c of the plane parallel optical member 14 of the superimposition means 13 to form a displayed image.

FIG. 6 illustrates how the micro lens array 17 is scanned with light. If it is assumed for example that in FIG. 5, the scanning means 21 can scan the 5 light from the light source 19 over an angle range of approximately 4 degrees in the horizontal direction and an angle range of approximately 3 degrees in the direction perpendicular to the plane of the drawing sheet and scanning is effected at 28.8 kHz in the horizontal direction and 60 Hz in the vertical direction, the micro lens array 17 will be scanned with 480 scanning lines, and scanning will be effected repeatedly 60 times per one second. In this process, if the light source 19 is always on, the micro lens array 17 will be viewed in a bright state uniformly illuminated by light. By turning on the light source 19 while synchronizing the scanning control means 33 and the display control means 131 that controls the radiation intensity of the light source 19 by the synchronization control means 35, it is possible to display, for example, letter "A" as a dot image on the micro lens array 17.

Since the resolution of the entire image is determined by the size of the dot image moved for scanning, it is necessary that the light from the light source 19 be condensed on the micro lens array 17. In view of this, the light from the light source 19 is condensed on the micro lens array 17 by a collimator lens system 23.

The light emergent from the micro lens array 17 is reflected by the PBS 25 having wavelength-selectivity and travels toward the pentaprism 9. The light traveling toward the pentaprism 9 is transmitted through the quarter-wave plate 27 provided on the flat surface 15a of the plane parallel optical member 14 and reflected by the reflecting condenser member 29 on which a hologram or wavelength selection film is attached (which will be representatively referred to as hologram hereinafter) so as to be returned to the PBS 25. Since the direction of polarization of the returned light has been changed as will be described later, it is transmitted through the PBS 25 and exits from the flat surface 15b of the superimposition means 13, so that it can be observed.

The scanning means 21 that is composed, for example, of a two dimensionally movable mirror or an acoustooptic device is made conjugate with the eye point EP (at which the pupil of a viewer's eye is positioned) by the refractive power of the micro lens array 17, the hologram 29 and the eyepiece lens 11. Consequently, it may be considered that the retina R is scanned by the scanning means 21 with the light from the light source 19 with the pupil being the pivot of scanning.

The apparatus is configured in such a way that the refractive power of the hologram 29 and the eyepiece lens 11 makes the micro lens array 17 substantially conjugate with the retina R of the viewer's eye at the eye point EP for viewing. Thus, a dot image on the micro lens array 17 is projected onto the retina R of the viewer's eye as it is, and when the dot image is moved in a scanning manner by the scanning means 21, it is recognized by the viewer as a displayed image.

In the case where the light source 19 is a limited light source such as an LED, the micro lens array 17 should be placed at a position conjugate with the light source 19, and in the case where the light source 19 is a laser (e.g. a semiconductor laser), the micro lens array 17 should be placed at the position of the focal point of the collimator lens system 23. If a laser is used as the light source 19, it is necessary to adjust the polarization direction of the laser beam in such a way that it is reflected by the PBS 25, as will be described later. Color content can also be displayed by using multiple light sources of red, green and blue as the light source 19 for superimposition on the micro lens array 17.

The light condensed on the micro lens array 17 enters the superimposition means 13 and travels along the optical axis IS. Then, for example the P polarization component of the light is reflected by the PBS 25 provided in the superimposition means 13 and travels toward the quarter-wave plate 27 and the hologram 29. The light transmitted through the quarter-wave plate 27 provided on the flat surface 15a is converted into circularly-polarized light and reflected by the hologram 29. The light is transmitted through the quarter-wave plate 27 again and enters the PBS 25. Since this light has been changed into linearly-polarized light whose polarization direction has been rotated 90 degrees from the polarization direction of the light that enters the PBS 25 from the micro lens array 17, it is transmitted through the PBS 25 and exits from the flat surface 15b of the superimposition means 13. Thus, the viewer can observe the light.

In view of the polarization direction through reflection by the scanning means 21, it is preferred that the axis of the light from the light source 19 and the axis of the light emergent from the superimposition means 13 be oriented in the same direction. In the case where the light from the light source 19 is incident from the front side or the rear side of the plane of the drawing sheet of FIG. 5, the above-described condition of the polarization direction of the light incident on the PBS 25 can be realized by inserting a half wave plate between the micro lens array 17 and the scanning means 21. By imaging a displayed image on the micro lens array 17, the pupil diameter (angle of view) is effectively enlarged upon viewing the displayed image, and therefore the displayed image can be imaged on the retina R of the viewer without fail even if the position of the viewer's eye is displaced or inclined from the optical axis. Since the decrease in the quantity of light of the displayed image is essentially limited only to the decrease relating to polarization (i.e. approximately 50%), high brightness of the displayed image can be achieved.

The camera equipped with the scanning display apparatus that makes it possible to superimpose an image of a subject (not shown) through the taking lens 3 and a displayed image on the micro lens array 17 on the retina R for view is constructed in this way.

In the fourth embodiment, the quantity of the light guided from the subject to be photographed to the viewing optical system 1 is regulated by light quantity limiting means 8 (which is for example a stop of the taking optical system) under control of light quantity control means 10. Adjustment of the quantity of light is effected by controlling the light quantity limiting means 8 through the light quantity control means 10 by sending a command to the light quantity control means 10 using an operation button or the like (not shown) provided on the camera. Thus, it is possible to balance the quantity of light from the subject to be photographed and the quantity of light of the displayed image displayed by the superimposition means 13 to achieve an easily viewable condition. The light quantity limiting means 8 may be a liquid crystal device, an electrochromic element or a variable ND filter, for example.

FIG. 7 shows a state of display in which camera control information is superimposed on an optical image 41 of a subject to be photographed. In the shown state, focus detection area marks AF1 to AF5 are superimposed on the image of the subject 41, where mark AF5 is selected by the photographer, and it is displayed for example in a different color. In this way, in the scanning display apparatus 30, the superimposition means 13 is controlled by the display control means 131 based on a camera control information image from the image processing means 6 to display a displayed image superimposed on the optical image 41 of the subject to be photographed. Thus, the photographer can obtain camera control information useful for photographing without taking his/her eye off the viewfinder.

In this fourth embodiment, to view a picked-up image, when the photographer enters a picked up image view command to the camera, the picked-up image of the subject is processed by the image processing means 6, and image information is sent to the display control means 131. The image information is made viewable to the photographer by the scanning display apparatus 30. In this process, the mirror control means 37 may retract the quick return mirror 5 away from the optical axis of the taking optical system to reduce the quantity of light incident on the viewing optical system to zero. In this state, it is possible to display in the viewfinder only the image picked up by the image pickup element 4, and therefore the photographer can view a high contrast reproduction image without influence of external light. In particular, since the scanning display apparatus 30 used in this embodiment can produce high resolution reproduction images, the quality of reproduction images can be enhanced by far as compared to conventional image displays. Accordingly, the photographer can view high quality reproduction images.

The light quantity limiting means 8 may limit the quantity of light guided from the taking optical system to the viewing optical system as a picked up image is viewed. By limiting the quantity of light incident on the viewing optical system from the taking optical system, the photographer can view a reproduction image having high contrast without little influence of external light.

As shown in FIG. 9, for example such a portion of the picked-up image 43 that exceeds the exposure latitude may be displayed in an easily noticeable color to inform the photographer of that there is a possibility that the density or color of that portion is not reproduced correctly. Based on this information, the photographer can change photographing conditions to take a photograph with a corrected exposure latitude again.

As described in the foregoing, according to the fourth embodiment, it is possible to provide a camera in which not only camera control image information is displayed superimposed on an optical image of the subject to be photographed, but also a high-quality reproduction image is viewable in the viewfinder.

Fifth Embodiment

Next, a camera according to a fifth embodiment of the present invention will be described with reference to drawings. A difference between the fifth embodiment and the fourth embodiment resides in the position of the light quantity limiting means. The other components are the same as those in the fourth embodiment and will be designated by the same reference signs, and descriptions thereof will be omitted.

In FIG. 10, light coming from a subject to be photographed (not shown) through a taking lens 3 is reflected by a semi-transparent mirror 105 and focused on a focusing screen 7. The image of the subject formed on the focusing screen 7 is incident on an eyepiece lens 11 through a pentaprism 9, and seen by a photographer's eye located at the eye point EP. On the other hand, light passing through the half mirror 105 is focused on an image pickup element 4, and the picked-up image is stored in image processing means 6. Image information from the image processing means 6 is sent to display control means 131 and superimposed in the viewing optical system 1 so as to be made viewable. Light quantity limiting means 108 is provided between the semi-transparent mirror 105 and the focusing screen 7 to limit the quantity of light of the image of the subject observed through the viewing optical system 1 by light quantity control means 110. The structures other than the above are the same as those in the fourth embodiment, and descriptions thereof will be omitted.

In the fifth embodiment, the light quantity limiting means 108 is provided between the semi-transparent mirror 105 and the focusing screen 7, and the quantity of light from the subject to be photographed to the viewing optical system 1 is limited under control by the light quantity control means 110. Adjustment of the quantity of light is effected by controlling the light quantity limiting means 108 through the light quantity control means 110 by sending a command to the light quantity control means 110 using an operation button or the like (not shown) provided on the camera. Thus, it is possible to balance the quantity of light from the subject to be photographed and the quantity of light of the displayed image displayed by the superimposition means 13 to achieve an easily viewable state. The light quantity limiting means 108 may be a liquid crystal device, an electrochromic element, a variable ND filter, or a variable aperture stop, for example.

As is the case with the fourth embodiment, in the fifth embodiment also, camera control information AF1 to AF5 can be displayed superimposed on an optical image 41 of the subject to be photographed as shown in FIG. 7. Other operations and advantageous effects of the fifth embodiment are the same as those in the fourth embodiment, and descriptions thereof will be omitted.

In the fifth embodiment, an optical image 41 of the subject to be photographed and a picked-up image 43 picked up by an image pickup element 4 are made viewable in a superimposed manner as shown in FIG. 11. In the fifth embodiment, the optical image 41 and the picked-up image 43 having the same image content are superimposed in the viewfinder for view. In connection with this, by limiting the quantity of light of the optical image using the light quantity limiting means 108, it is possible to achieve a preferred viewing condition of the optical image 41 and the picked-up image 43. In this state, for example such a portion 45 of the picked-up image 43 that exceeds the exposure latitude may be displayed in an easily noticeable color to inform the photographer in advance of the fact that there is a possibility that the density or color of that portion is not reproduced correctly. Based on this information, the photographer can change photographing conditions to take a photograph with a corrected exposure latitude.

The light quantity limiting means 108 may reduce the quantity of light incident on the viewing optical system 1 to substantially zero. In this state, it is possible to display only the image picked up by the image pickup element 4, and therefore the photographer can view a high contrast reproduction image without influence of external light. In particular, since the scanning display apparatus 40 used in this embodiment can produce high resolution reproduction images, the quality of reproduction images can be enhanced by far as compared to conventional image displays. Accordingly, the photographer can view high quality reproduction images.

In connection with the above, in order to reduce the quantity of light of the optical image incident on the focusing screen 7 to substantially zero, the semi-transparent mirror 105 may be retracted away from the optical axis of the taking optical system.

As described in the foregoing, according to the fifth embodiment, it is possible to provide a camera in which not only camera control image information is displayed in such a way as to be superimposed on an optical image of the subject to be photographed but also the optical image and a reproduction image are displayed in a superimposed manner, where information concerning, for example, to the reproduction image quality can be indicated as color information. Moreover, by limiting the quantity of light of the optical image, high quality reproduction images can be viewed in the viewfinder.

Figure 12:
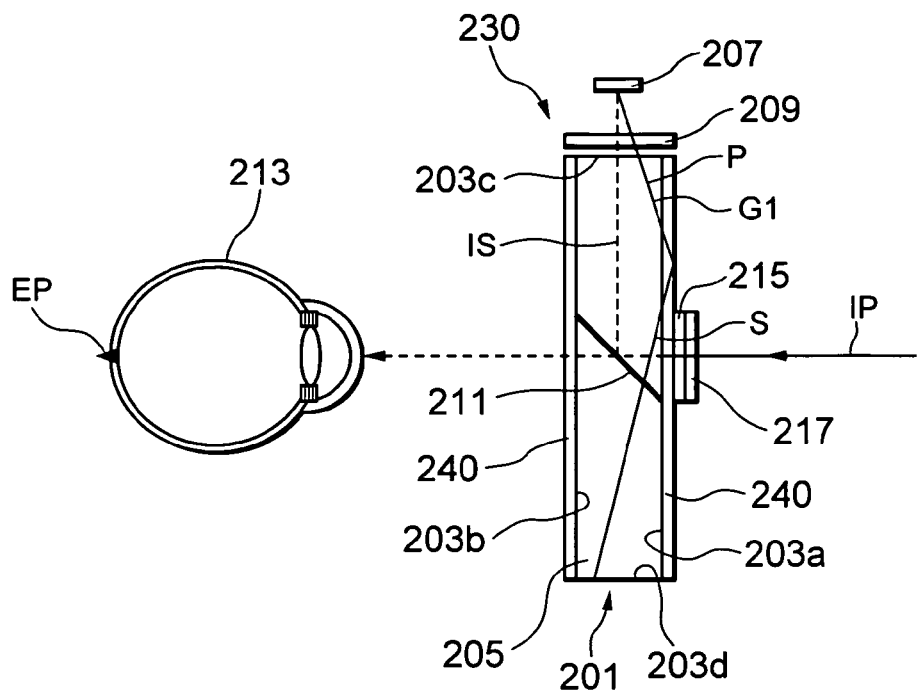
FIG. 12 schematically shows the configuration of a display apparatus according to a sixth embodiment of the present invention.
Figure 13:
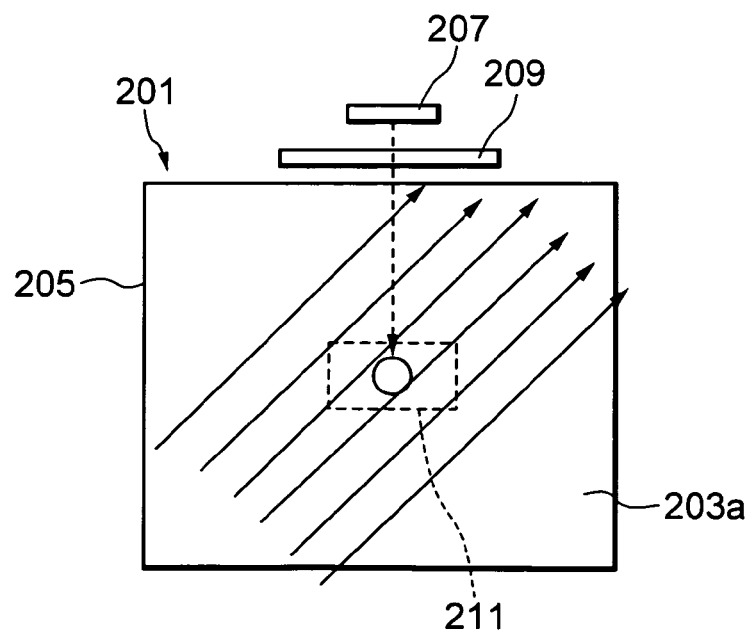
FIG. 13 shows an example of the direction of rubbing applied on a quarter-wave plate in the sixth embodiment.
Figure 14:
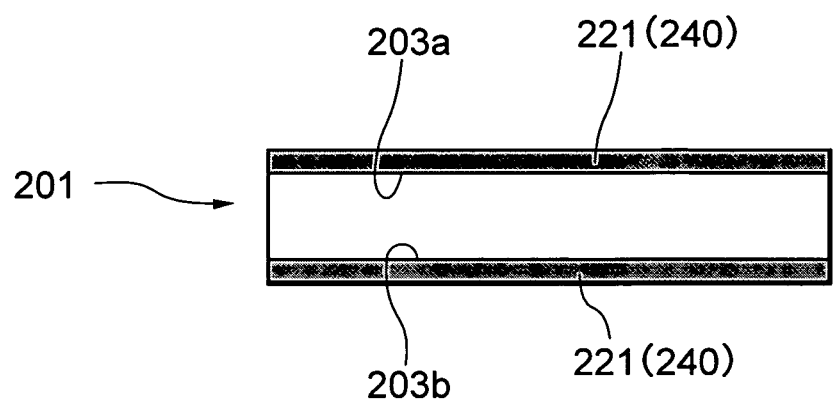
FIG. 14 shows an example of an optical member having a quarter-wave plate in the sixth embodiment.
Figure 15:
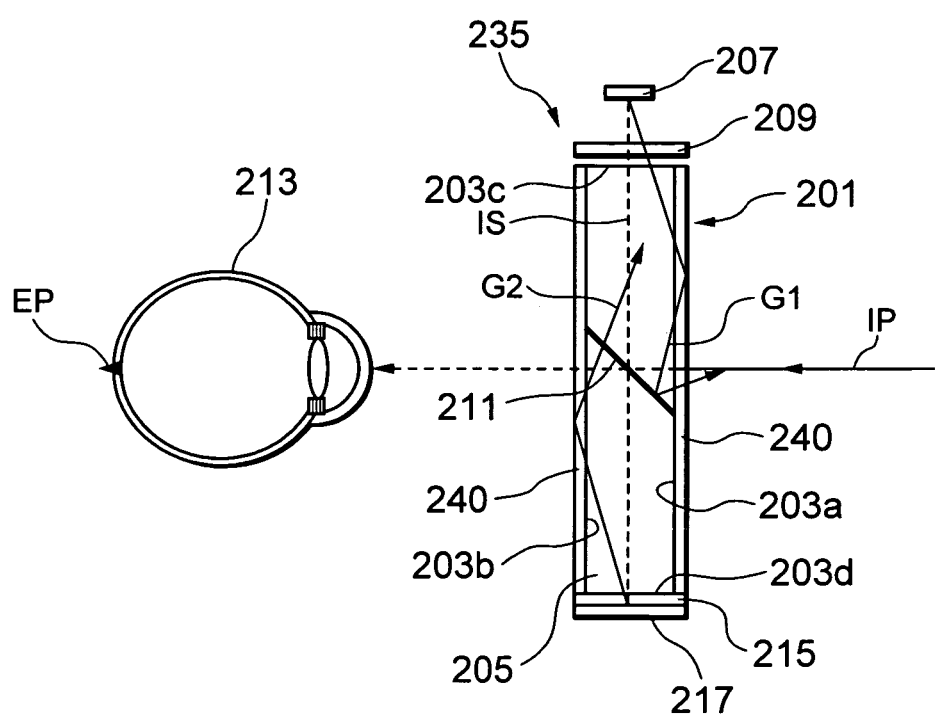
FIG. 15 schematically shows the configuration of a display apparatus according to a seventh embodiment.
Figure 16:
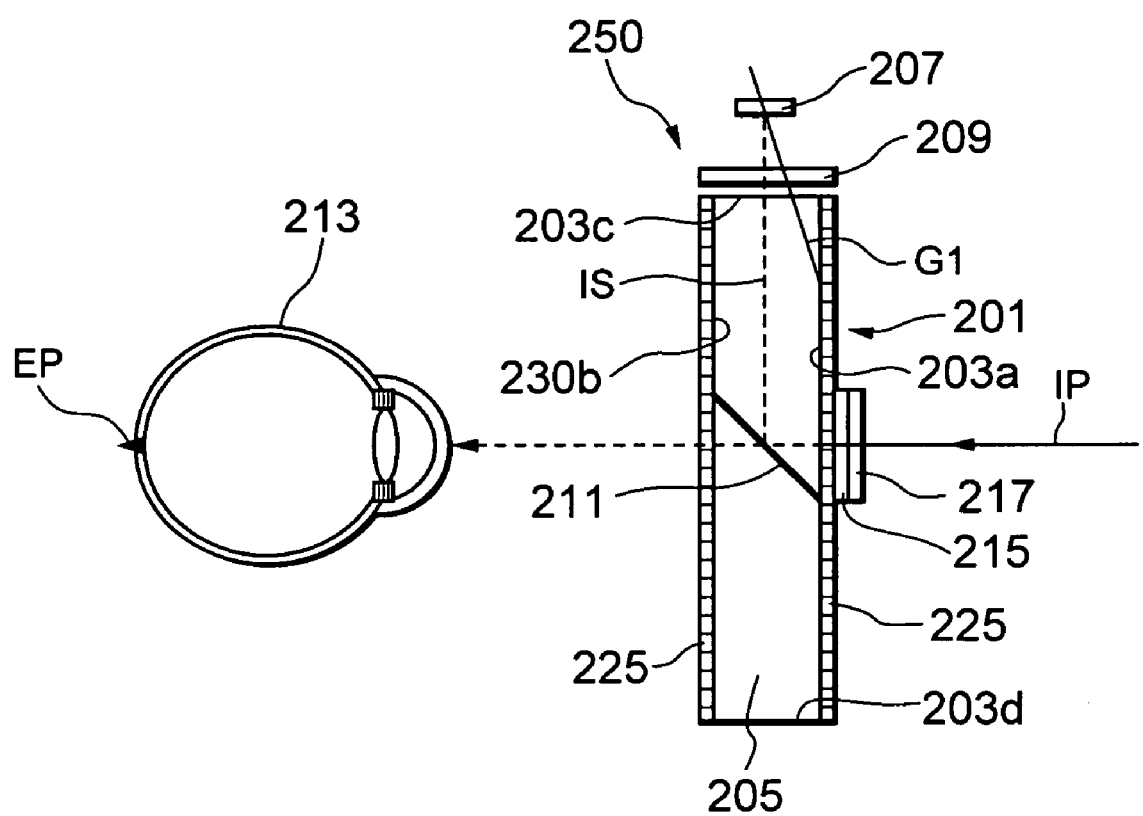
FIG. 16 schematically shows the configuration of a display apparatus according to an eighth embodiment.

FIG. 12 schematically shows the configuration of a display apparatus according to a sixth embodiment of the present invention. FIG. 13 shows an example of the direction of rubbing applied on a quarter-wave plate in the sixth embodiment. FIG. 14 shows an example of an optical member having a quarter-wave plate in the sixth embodiment. FIG. 15 schematically shows the configuration of a display apparatus according to a seventh embodiment. FIG. 16 schematically shows the configuration of a display apparatus according to an eighth embodiment.

Sixth Embodiment

In FIG. 12, an optical image (not shown) enters along the optical axis IP of the viewing optical system and is viewed by a photographer at the eye point EP. A superimposition optical system 201 for displaying an electronic image superimposed on an optical image is provided in the optical path of the viewing optical system. The superimposition optical system 201 is composed of an optical member 205 having a pair of flat surfaces 203a, 203b substantially perpendicular to the optical axis IP of the viewing optical system and a flat surface 203c substantially perpendicular to these flat surfaces 203a, 203b to constitute an optical waveguide. In the vicinity of the flat surface 203c, there is provided a display member 207 serving as image forming means for displaying an electronic image. A polarizing plate 209 is provided between the display member 207 and the flat surface 203c.

The superimposition optical system 201 is provided with a polarizing beam splitter (PBS) 211 that is inclined to form an angle of approximately 45 degrees with the optical axis IP of the viewing optical system and the axis IS of the display light respectively. The polarizing beam splitter 211 reflects light that is polarized in a specific direction to the direction opposite to the viewer's eye 213. The reflected light is incident on and transmitted through a quarter-wave plate 215 disposed in the optical path of the viewing optical system on the flat surface 203a on which an optical image is incident, thereafter incident on a reflecting condenser member 217 and reflected toward the PBS 211. The quarter-wave plate 215 and the reflecting condenser member 217 are made of materials that are substantially transparent to the light traveling in the optical path of the viewing optical system, and therefore the optical image is hardly deteriorated. As will be described later, the polarization direction of the light returned back to the PBS 211 has been rotated, and it is transmitted through the PBS 211 and observed at the eye point EP. The display apparatus 230 that makes it possible to view a displayed image from the display member 207 superimposed on an optical image from the viewing optical system is constructed as above. The optical axis IP of the viewing optical system and the optical axis IS of the display optical system are arranged in such a way as to be substantially perpendicular to each other.

Light from an electronic image (which will also be referred to as a displayed image) displayed on the display member 207 is polarized by the polarizing plate 209 in a predetermined direction (e.g. P polarization component) and incident on the optical member 205 from the flat surface 203c. The incident light travels along the optical axis IS of the display optical system, and for example its P-polarization component is reflected by the PBS 211 provided in the superimposition optical system 201 and travels to the quarter-wave plate 215 and the reflecting condenser member 217 on which a hologram or wavelength selection film is attached (which will be representatively referred to as hologram hereinafter). The quarter wave plate 215 and the reflecting condenser member 217 are provided on the flat surface 203a that faces away from the viewer's eye 213. The light transmitted through the quarter-wave plate 215 is converted into circularly polarized light and reflected by the hologram 217. The light is then transmitted through the quarter-wave plate 215 again, whereby it is converted into linearly polarized light. Since the light is converted into linearly polarized light whose direction of polarization has been rotated 90 degrees from the 5 polarization direction of the light that enters the hologram 217 after reflected by the PBS 211, it is transmitted through the PBS 211. Then, the light exits from the superimposition optical system 1 and is focused on the retina of the viewer's eye at the eye point EP.

In this sixth embodiment, quarter-wave plates 240, 240 are formed on almost the entire area of the flat surfaces 203a, 203b of the optical member 205 serving as an optical waveguide that are substantially perpendicular to the optical axis IP of the viewing optical system. The quarter-wave plates 240, 240 act to change the phase of such light that is emitted from the display member 207, incident on the flat surfaces 203a, 203b and reflected at their interface with air (which light is illustrated by solid line G1 in the drawing, by way of example) by an angle of approximately 90 degrees, but exercise no substantial effect on the light reflected by the PBS 211 (i.e. light of the displayed image) that enters the flat surfaces 203a, 203b substantially perpendicularly. Consequently, the phase of the light G1 that enters the flat surfaces 203a, 203b and is reflected at their interface with air to exit (which used to become ghost light in conventional apparatuses) is rotated approximately 90 degrees from the incident light. If light polarized into for example P-polarized light by the polarizing plate 209 enters the flat surface 203a and is reflected at its interface with air to exit, it is converted into S-polarized light by rotation of the polarization direction of 90 degrees. Since the PBS 211 is designed to reflect the P-polarized component of light, the light having entered and been reflected out of the flat surfaces 203a, 203b is transmitted through the PBS 211. Therefore, such light is prevented from being reflected by the PBS 211, incident on and reflected from the hologram 217 and delivered to the viewer's eye 213. The light transmitted through the PBS 211 exits from the flat surface 203d of the optical member 205. A light absorbing member may be provided on the flat surface 203d to absorb light incident thereon.

As per the above, according to the sixth embodiment, it is possible to eliminate ghost light (e.g. G1) that enters the viewer's eye 213 after entering the flat surfaces 203a, 203b of the superimposition optical system 201 and reflected at their interface with air to exit therefrom.

Next, the quarter-wave plates 240, 240 formed on the flat surfaces 203a, 203b will be described. FIG. 13 is a schematic diagram as seen from the eye point EP shown in FIG. 12. Here, the description will be directed to the case of forming the quarter-wave plate 240 on the flat surface 203a. The same description will also apply to the flat surface 203b, and the description thereof will be omitted.

In FIGS. 13 and 14, rubbing is applied on the flat surface 203a in the direction of approximately 45 degrees (indicated by the arrows in FIG. 13) relative to the optical axis IS of the display optical system. Rubbing is processing used in liquid crystal manufacturing process. By rubbing, small undulation or grooves are formed on the flat surface 203a along specific directions (directions indicated by the arrows). On the surface thus processed is applied ultraviolet curing liquid crystal 221 with a predetermined thickness. The application is performed using a so-called spin coating apparatus. The thickness of the ultraviolet curing liquid crystal 221 is designed in such a way as to provide an optical path difference that causes the phase of light that is supposed to become ghost light to rotate approximately 90 degrees.

Liquid crystal molecules of the ultraviolet curing liquid crystal 221 applied by the spin coating apparatus are aligned regularly along the direction of rubbing, and the ultraviolet curing liquid crystal 221 shows a specific optical anisotropy. Thereafter, the ultraviolet curing liquid crystal 221 is cured by irradiation with ultraviolet light, so that it is fixed as a quarter-wave plate 240 on the flat surface 203a. Similarly, a quarter-wave plate 240 is also formed on the flat surface 203b.

The quarter-wave plate 240 is not limited to the above-described ultraviolet curing liquid crystal 221, but a quarter-wave plate film or a quarter-wave crystal plate that generates a predetermined phase difference may be applied on the entire area of the flat surfaces 203a, 203b. The quarter-wave plate 240 may be provided on only one of the flat surfaces 203a, 203b. How the quarter-wave plate(s) 240 is to be provided may be determined in accordance with the condition of ghost light generated.

In the sixth embodiment, the PBS 211 may be disposed in such a way that display light reflected by the PBS 211 is immediately directed toward the eye point EP to eliminate the quarter wave plate 215 and the hologram 217.

Seventh Embodiment

Next, a display apparatus according to a seventh embodiment of the present invention will be described. A difference between the seventh embodiment and the sixth embodiment is the difference in the position of the hologram 217 and the quarter-wave plate 215 for imaging a displayed image onto the retina of the viewer's eye. The components that are the same as those in the sixth embodiment will be designated by the same reference numerals, and descriptions thereof will be omitted.

In FIG. 15, light from a display member 207 is polarized in a predetermined polarization direction (e.g. P-polarized light) by a polarizing plate 209 and incident on a flat surface 203c of an optical member 205 serving as an optical waveguide. The incident light travels along the optical axis IS of the display optical system, passes through a PBS 211 provided in a superimposition optical system 201, exits from a flat surface 203d opposite to the flat surface 203c, enters and passes through a quarter-wave plate 215, enters the hologram 217 and is reflected and returned toward the PBS 211. Since the direction of polarization of the returned light has been rotated 90 degrees by the quarter-wave plate 215, it is reflected by the PBS 211. Thus, the light enters the viewer's eye 213 and is focused at the eye point EP. As a result, a displayed image on the display member 207 and an optical image of the viewing optical system IP can be viewed at the eye point EP in a superimposed manner. The display apparatus 235 is constructed in this way.

In the seventh embodiment, the quarter-wave plates 240, 240 are formed on two flat surfaces 203a, 203b of the optical member 205 in a similar manner as in the sixth embodiment. A portion of light from the display member 207 that is incident on the flat surfaces 203a, 203b and reflected at their interface with air (for example, light shown by solid line G1 in the drawing) is reflected by the PBS 211 and exits from the optical member 205, since the direction of polarization of such light has been rotated approximately 90 degrees by the quarter-wave plate 240. Thus, such light is not incident on the hologram 217. Accordingly, it is possible to prevent ghost light G1 from entering the viewer's eye 213.

Furthermore, a portion of display light that is transmitted through the PBS 211, incident on the hologram 217, irregularly reflected by the quarter-wave plate 215 or the hologram 217 and incident on the flat surfaces 203a, 203b (for example, light shown by solid line G2 in the drawing) is transmitted through the PBS 211, since the direction of polarization of such light has been rotated approximately 90 degrees by the quarter-wave plate 240. Thus, such light is not emitted toward the viewer's eye 213.

As per the above, in the display apparatus 230 according to the seventh embodiment, it is possible to prevent ghost light G1 and G2 from entering the viewer's eye 213 by providing the quarter-wave plates 240, 240 on the flat surfaces 203a, 203b of the plane parallel optical member 214.

The constitution of the quarter-wave plates 240, 240 is the same as that in the sixth embodiment, and a description thereof will be omitted. The quarter-wave plate(s) 240 may be provided on both or one of the flat surfaces 203a, 203b. How the quarter-wave plate(s) 240 is to be provided may be determined in accordance with the condition of ghost light generated.

Eighth Embodiment

Next, a display apparatus according to an eighth embodiment of the present invention will be described. What is different in the eighth embodiment from the sixth and seventh embodiments is that the quarter-wave plate 240 is replaced by a light regulating member. The other components are the same as those in the sixth and seventh embodiments, and descriptions thereof will be omitted.

In the eighth embodiment shown in FIG. 16, light regulating members 225, 225 are provided on two flat surfaces 203a, 203b of an optical member 205 to constitute a display apparatus 250.

The light regulating members 225, 225 are adapted to transmit light that is incident substantially perpendicularly on the flat surfaces 203a, 203b and to block light with an angle of incidence larger than a predetermined angle. (The light regulating member may be, for example, an optical filter having micro louvers manufactured by SUMITOMO 3M Limited.) By this feature, light from a display member 207 incident on the flat surface 203a, 203b as ghost light (e.g. light G1 in the drawing) is blocked by the light regulating member 225. Therefore, such light is prevented from being reflected by the PBS 211, passing through the quarter-wave plate 215 and the hologram 217, exiting from the superimposition optical system 201 and focused on the viewer's eye 213.

Whether the light regulating member 225 is to be provided on both or one of the flat surfaces 203a, 203b may be determined fitly in accordance with the condition of ghost light generated.

What is claimed is:

1. A camera comprising:
    an optical block disposed in an optical path of a viewing optical system for viewing an image of a subject obtained by a photographic lens and having a pair of flat surfaces that are substantially perpendicular to an optical axis of the viewing optical system;
    a micro lens array disposed on the optical block outside of the optical path for viewing the image of the subject;
    a condenser optical system for condensing light from a light source onto the micro lens array; and
    a scanner for scanning the light condensed by the condenser optical system;
    wherein an electronic image formed by the scanner is superimposed on the image of the subject, and is made viewable.

2. The camera according to claim 1, wherein the optical block includes a polarizing beam splitter having wavelength-selectivity disposed in the optical path of the viewing optical system that reflects light from the micro lens array, a reflecting condenser member disposed in the optical path of the viewing optical system that transmits the image of the subject and reflects the light from the polarizing beam splitter, and a quarter-wave plate disposed between the polarizing beam splitter and the reflecting condenser member.

3. The camera according to claim 2, wherein the reflecting condenser member includes a holographic device.

4. The camera according to claim 1, wherein the optical block includes a reflection type hologram that reflects the light from the micro lens array.

5. The camera according to claim 1, wherein the micro lens array is carved on an incidence end surface of a plane parallel optical member.

6. The camera according to claim 1, wherein the micro lens array is attached on an incidence end surface of a plane parallel optical member.

7. The camera according to claim 1, wherein the micro lens array includes a holographic device.

8. The camera according to claim 1, wherein the scanner includes a movable mirror or an acoustooptical device.

9. The camera according to claim 1, wherein an optical axis of incidence of light from the light source to the scanner and an optical axis of the viewing optical system are oriented in substantially the same direction.

10. The camera according to claim 1, wherein an optical axis of incidence of light from the light source to the scanner and an optical axis of the viewing optical system are substantially perpendicular, and further comprising a half-wave plate disposed between the scanner and the polarizing beam splitter.

11. The camera according to claim 1, further comprising: shielding means for shielding at least a portion of a light flux entering the viewing optical system from the photographic lens; and a controller that controls the shielding means such that when the reproduced image is introduced onto the optical axis of the viewing optical system, at least a portion of the light flux entering the viewing optical system is shielded.

12. The camera according to claim 1, further comprising: a quick return mirror that selectively guides a light flux from the photographic lens to the viewing optical system; wherein when the reproduced image is introduced onto the optical axis of the viewing optical system, the quick return mirror blocks the image of the subject.

13. The camera according to claim 12, wherein the optical device makes the image of the subject and the reproduced image viewable in a superimposed manner.

14. The camera according to claim 1, further comprising: an aperture stop that limits a light quantity of a light flux entering the viewing optical system from the photographic lens; wherein when the reproduced image is introduced onto the optical axis of the viewing optical system, the aperture stop limits the light quantity of the light flux.

15. The camera according to claim 14, wherein the optical device makes the image of the subject and the reproduced image viewable in a superimposed manner.

16. The camera according to claim 14, further comprising an image processing circuit that applies characterization on at least a part of the reproduced image.

17. A camera comprising: an optical block disposed in an optical path of a viewing optical system for viewing an image of a subject formed by a photographic lens and having a pair of flat surfaces that are substantially perpendicular to an optical axis of the viewing optical system; a micro lens array disposed on the optical block outside of the optical path for viewing the image of the subject; a condenser optical system for condensing light from a light source onto an incidence end surface of the optical block; and a scanner for scanning the light condensed by the condenser optical system; wherein the optical block includes a polarizing beam splitter disposed in the optical path of the viewing optical system that reflects light from the incidence end surface, a reflecting condenser member disposed in the optical path of the viewing optical system that transmits the image of the subject and reflects the light from the polarizing beam splitter, and a quarter-wave plate disposed between the polarizing beam splitter and the reflecting condenser member, and wherein an electronic image formed by the scanner is superimposed on the image of the subject, and is made viewable.

18. The camera according to claim 17, wherein the reflecting condenser member includes a holographic device.

19. The camera according to claim 17, wherein the scanner includes a movable mirror or an acoustooptical device.

20. The camera according to claim 17, wherein an optical axis of incidence of light from the light source to the scanner and an optical axis of the viewing optical system are oriented in substantially the same direction.

21. The camera according to claim 17, wherein an optical axis of incidence of light from the light source to the scanner and an optical axis of the viewing optical system are substantially perpendicular, and further comprising a half-wave plate disposed between the scanner and the polarizing beam splitter.

* * * * *